United States Patent
Zhou et al.

(10) Patent No.: US 8,989,116 B2
(45) Date of Patent: Mar. 24, 2015

(54) METHOD AND SYSTEM FOR SETTING UP A BEARER

(75) Inventors: Jinyi Zhou, Shenzhen (CN); Lan Liu, Shenzhen (CN); Xiaolong Guo, Shenzhen (CN); Ming Li, Shenzhen (CN); Zhe Chen, Shenzhen (CN); Qi Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 68 days.

(21) Appl. No.: 13/558,691

(22) Filed: Jul. 26, 2012

(65) Prior Publication Data

US 2012/0287894 A1    Nov. 15, 2012

Related U.S. Application Data

(63) Continuation of application No. 12/757,638, filed on Apr. 9, 2010, now Pat. No. 8,243,675, which is a continuation of application No. PCT/CN2008/072614, filed on Oct. 8, 2008.

(30) Foreign Application Priority Data

Oct. 11, 2007    (CN) .......................... 2007 1 0163715

(51) Int. Cl.
*H04W 4/00*    (2009.01)
*H04W 76/02*   (2009.01)
*H04L 12/66*   (2006.01)

(52) U.S. Cl.
CPC .............. *H04W 76/021* (2013.01); *H04L 12/66* (2013.01); *H04W 76/022* (2013.01)
USPC ......................................................... 370/329

(58) Field of Classification Search
CPC .................... H04W 36/0066; H04W 36/0044; H04W 36/14; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS 6,608,832 B2 *   8/2003   Forslow ........................ 370/353
6,618,591 B1 *   9/2003   Kalliokulju et al. ....... 455/452.2

(Continued)

FOREIGN PATENT DOCUMENTS

CN    1581744    2/2005
CN    1625152    6/2005

(Continued)

OTHER PUBLICATIONS

"3rd Generation Partnership Project; Technical Specification Group Services and System Aspects; General Packet Radio Service (GRPS); Service description; Stage 2 (Release 7)", 3GPP TS 23.060, V7.4.0, Mar. 2007, pp. 1-215.

(Continued)

*Primary Examiner* — Jung-Jen Liu
(74) *Attorney, Agent, or Firm* — Huawei Technologies Co., Ltd.

(57) ABSTRACT

Method and system for setting up a bearer are disclosed. The bearer setup method includes these steps: a packet data network gateway (PGW) obtains first quality of service (QoS) information and a first bearer identifier (ID), and sets up a bearer between the PGW and a radio access network (RAN) according to the first QoS information, where the bearer is associated with the first bearer ID; the RAN sets up a radio bearer (RB) with a user equipment (UE) according to second QoS information associated with the first QoS information, where the RB is associated with a second bearer ID associated with the first bearer ID.

8 Claims, 18 Drawing Sheets

---

The PGW obtains first QoS information and a first bearer ID, and sets up a bearer with the RAN, where the bearer is associated with the first bearer ID — 301

↓

The RAN sets up an RB with the UE according to the second QoS information, where: the RB is associated with the second bearer ID; the second QoS information is associated with the first QoS information; and the second bearer ID is associated with the first bearer ID — 302

(56) References Cited

U.S. PATENT DOCUMENTS

| | | | |
|---|---|---|---|
| 6,621,793 B2* | 9/2003 | Widegren et al. | 370/230.1 |
| 6,690,679 B1* | 2/2004 | Turunen et al. | 370/469 |
| 6,845,095 B2* | 1/2005 | Krishnarajah et al. | 370/349 |
| 7,023,820 B2* | 4/2006 | Chaskar | 370/329 |
| 7,532,613 B1* | 5/2009 | Sen et al. | 370/352 |
| 7,634,274 B2* | 12/2009 | Hurtta | 455/450 |
| 7,680,478 B2* | 3/2010 | Willars et al. | 455/343.2 |
| 7,756,119 B2* | 7/2010 | Pasanen et al. | 370/352 |
| 8,064,384 B2* | 11/2011 | Chen et al. | 370/328 |
| 8,072,923 B2* | 12/2011 | Chen et al. | 370/328 |
| 8,085,731 B2* | 12/2011 | Zhao et al. | 370/331 |
| 8,125,889 B2* | 2/2012 | Hu | 370/216 |
| 2002/0114305 A1* | 8/2002 | Oyama et al. | 370/338 |
| 2003/0039237 A1* | 2/2003 | Forslow | 370/352 |
| 2004/0127237 A1* | 7/2004 | Hurtta | 455/466 |
| 2004/0127238 A1* | 7/2004 | Bianconi et al. | 455/466 |
| 2006/0034278 A1* | 2/2006 | Hundscheidt et al. | 370/390 |
| 2006/0140159 A1* | 6/2006 | Choi et al. | 370/336 |
| 2006/0268818 A1* | 11/2006 | Chen et al. | 370/349 |
| 2006/0274706 A1 | 12/2006 | Chen et al. | |
| 2006/0285512 A1* | 12/2006 | Lee et al. | 370/328 |
| 2007/0002868 A1* | 1/2007 | Qian et al. | 370/395.21 |
| 2007/0019643 A1* | 1/2007 | Shaheen | 370/389 |
| 2007/0180030 A1 | 8/2007 | Xu et al. | |
| 2007/0204050 A1* | 8/2007 | Liu et al. | 709/230 |
| 2007/0237134 A1 | 10/2007 | Bergenlid et al. | |
| 2008/0025263 A1* | 1/2008 | Pelkonen | 370/332 |
| 2008/0267143 A1* | 10/2008 | Pasanen et al. | 370/338 |
| 2008/0293428 A1* | 11/2008 | Rey et al. | 455/452.2 |
| 2009/0052384 A1* | 2/2009 | Zisimopoulous et al. | 370/329 |
| 2010/0226332 A1 | 9/2010 | Zhou et al. | |
| 2010/0246533 A1* | 9/2010 | Lundin et al. | 370/332 |
| 2012/0076035 A1 | 3/2012 | Zhou et al. | |

FOREIGN PATENT DOCUMENTS

| | | |
|---|---|---|
| CN | 101409951 | 8/2010 |
| CN | 101925136 | 9/2012 |
| EP | 1753188 | 2/2007 |
| WO | WO2006/137705 | 12/2006 |
| WO | WO2009/049529 | 4/2009 |

OTHER PUBLICATIONS

"3$^{rd}$ Generation Partnership Project; Technical Specification Group Services and System Aspects; GPRS enhancements for E-UTRAN access (Release 8)", 3GPP TS 23.401, V1.1.0, Jul. 2007, pp. 1-77.

"3$^{rd}$ Generation Partnership Project; Technical Specification Group Services and System Aspects; 3GPP System Architecture Evolution; Report on Technical Options and Conclusions (Release 7)", 3GPP TS 23.882, V1.11.0, Jul. 2007, pp. 1-211.

International Search Report issued Jan. 15, 2009 in corresponding International Patent Application No. PCT/CN2008/072614.

Written Opinion of the International Searching Authority issued Jan. 15, 2009 in corresponding International Patent Application No. PCT/CN2008/072614.

Extended European Search Report issued Mar. 4, 2011 in corresponding European Patent Application No. 08838981.

U.S. Office Action issued Apr. 11, 2012 in related U.S. Appl. No. 13/313,456.

U.S. Notice of Allowance issued Apr. 26, 2012 in related U.S. Appl. No. 12/757,638.

Extended European Search Report issued Nov. 11, 2013 in corresponding European Patent Application No. 13180618.4.

"3$^{rd}$ Generation Partnership Project; Technical Specification Group Services and System Aspects; GPRS enhancements for E-UTRAN access (Release 8)", 3GPP TS 23.401 V1.2.1, Sep. 2007, pp. 1-87.

"Proposal on PDP Context Activation procedure from UTRAN", 3GGP TSG SA WG2 Meeting #60, Oct. 2007, pp. 1-3.

"EPS bearer—PDP context mapping in the terminal", 3GGP TSG SA WG2 Meeting #60, Oct. 2007, pp. 1-3.

* cited by examiner

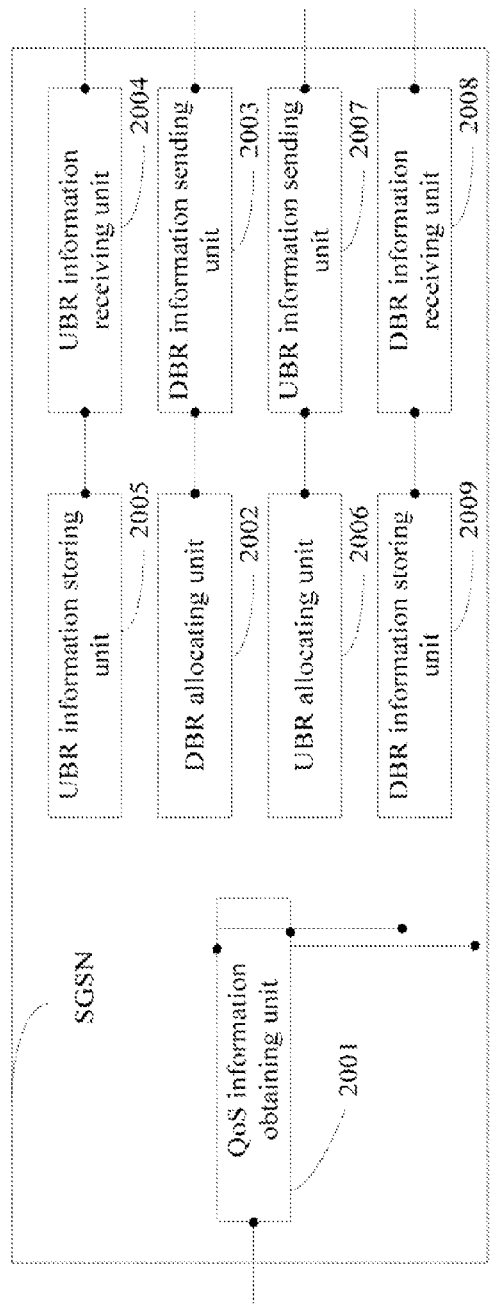
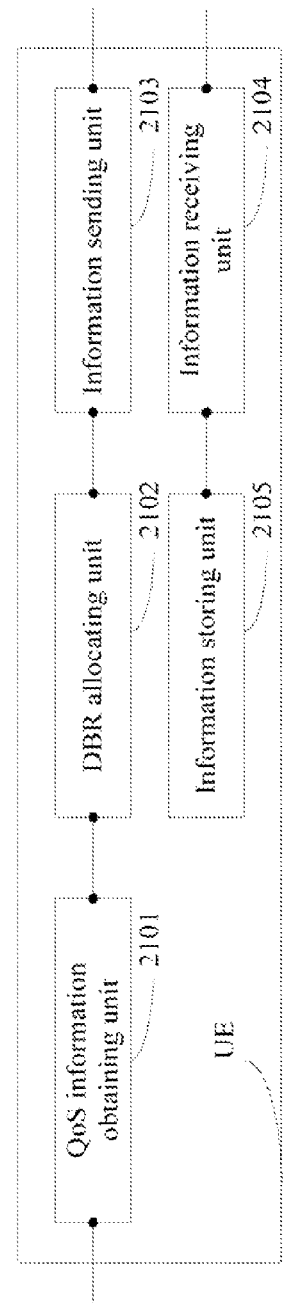
FIG. 20
FIG. 21

METHOD AND SYSTEM FOR SETTING UP A BEARER

CROSS-REFERENCE TO RELATED APPLICATIONS

This application is a continuation of U.S. patent application Ser. No. 12/757,638, filed on Apr. 9, 2010 now U.S. Pat. No. 8,243,675, which is a continuation of International Application No. PCT/CN2008/072614, filed on Oct. 8, 2008. The International Application claims priority to Chinese Patent Application No. 200710163715.9, filed on Oct. 11, 2007. All of the above-referenced applications are hereby incorporated by reference in their entireties.

FIELD OF THE INVENTION

The present invention relates to the field of communication technologies, and in particular, to a method and system for setting up a bearer.

BACKGROUND OF THE INVENTION

The Third Generation Partnership Project (3GPP) proposes a long term evolution system architecture evolution (LTE/SAE) network. The purpose of the LTE network is to reduce delay, to increase user data rate, to improve system capacity, and to lower coverage costs. For better description, the SAE network architecture is divided into the following two parts, as shown in FIG. 1.

The first part includes a user equipment (UE) 101, a radio access network (RAN) 102, a serving general packet radio service support node (SGSN) 103, and a packet data network gateway (PGW) 104.

The RAN consists of a radio network controller (RNC) and a NodeB. The RNC is adapted to allocate and control radio resources of the NodeB connected to or related to the RNC. The RNC implements functions such as connection setup and disconnection, handover, macro diversity combining (MDC), and radio resource management control. The NodeB converts data streams and manages a part of radio resources.

The SGSN is responsible for forwarding input/output Internet Protocol (IP) packets for UEs in a local service area. The SGSN provides functions such as routing and forwarding of packets in the local service area, provision of services for all the UEs in the local service area, encryption and authentication, session management, and mobility management. The SGSN 103 is an SGSN of 3GPP R7 or earlier versions. The SGSN 103 is designed to enable the SAE architecture to be compatible with earlier systems.

The PGW is responsible for connecting a UE to a user plane anchor point of a packet data network (PDN) and communicating with external PDNs. It is also responsible for routing and forwarding packets, enhancing policy charging, filtering packets based on each user. In addition, the PGW is connected to an operator's IP network.

The second part includes a UE 101, an RAN 105, an SGSN 106, a serving gateway (SGW) 107, and a PGW 104.

The SGW stores user plane contexts of the UE, for example, IP address and routing information of the UE, and performs lawful interception and packet data routing.

The SGSN 106 is an SGSN of 3GPP R8, and can communicate with the SGW directly.

A method for setting up a bearer in the prior art is based on an SGSN of 3GPP R7 or earlier versions, which can be connected to the PGW directly. Thus, a bearer between the UE and the PGW can set up through the RAN and the SGSN.

SUMMARY OF THE INVENTION

The objective of embodiments of the present invention is to provide a method and system for setting up a bearer. Based on the technical solution of the embodiments of the present invention, a complete bearer setup solution can be accomplished based on 3GPP R8.

The objective of the embodiments of the present invention is achieved through the following technical solution:

A method for setting up a bearer according to an embodiment of the present invention includes:

obtaining, by a packet data network gateway (PGW), first quality of service (QoS) information and a first bearer identifier (ID), and setting up a bearer between the PGW and a radio access network (RAN) according to the first QoS information, where the bearer is associated with the first bearer ID; and setting up, by the RAN, a radio bearer (RB) between the RAN and a user equipment (UE) according to second QoS information, where the RB is associated with a second bearer ID, the second QoS information is associated with the first QoS information, and the second bearer ID is associated with the first bearer ID.

A packet data network gateway (PGW) according to an embodiment of the present invention includes:

a QoS information obtaining unit, adapted to obtain first QoS information;

an uplink bearer resource (UBR) allocating unit, adapted to allocate information about the first UBR for a first bearer according to the first QoS information;

an information sending unit, adapted to send the first QoS information and information about the first UBR;

an information receiving unit, adapted to receive the first QoS information, first downlink bearer resource (DBR) information, and a first bearer ID; and an information storing unit, adapted to store the first QoS information, the information about the first DBR, and the first bearer ID.

A serving gateway (SGW) according to an embodiment of the present invention includes:

a QoS information obtaining unit, adapted to obtain first QoS information;

a DBR allocating unit, adapted to allocate a first DBR for a first bearer according to the first QoS information;

a DBR information sending unit, adapted to send the first QoS information and information about the first DBR;

a UBR information receiving unit, adapted to receive the first QoS information, information about the first UBR, and a first bearer ED;

a UBR information storing unit, adapted to store the first QoS information, the information about the first UBR, and the first bearer ID;

a UBR allocating unit, adapted to allocate a second UBR for a second bearer according to the first QoS information;

a UBR information sending unit, adapted to send the first QoS information and information about the second UBR;

a DBR information receiving unit, adapted to receive the first QoS information, information about the second DBR, and the first bearer ID; and a DBR information storing unit, adapted to store the first QoS information, the information about the second DBR, and the first bearer ID.

A serving general packet radio service support node (SGSN) according to an embodiment of the present invention includes:

a QoS information obtaining unit, adapted to obtain first QoS information;

a DBR allocating unit, adapted to allocate a second DBR for a second bearer according to the first QoS information;

a DBR information sending unit, adapted to send the first QoS information and information about the second DBR;

a UBR information receiving unit, adapted to receive the first QoS information, information about the second UBR, and a first bearer ID;

a UBR information storing unit, adapted to store the first QoS information, the information about the second UBR, and the first bearer ID;

a UBR allocating unit, adapted to allocate a third UBR for the second bearer according to second QoS information associated with the first QoS information;

a UBR information sending unit, adapted to send the second QoS information and information about the third UBR;

a DBR information receiving unit, adapted to receive the second QoS information, the information about the third DBR, and a second bearer ID associated with the first bearer ID; and a DBR information storing unit, adapted to store the second QoS information, the information about the third DBR, and the second bearer ID.

A UE according to an embodiment of the present invention includes:

a QoS information obtaining unit, adapted to obtain second QoS information;

a DBR allocating unit, adapted to allocate a radio bearer DBR for the RB according to the second QoS information;

an information sending unit, adapted to send, the second QoS information and information about the radio bearer DBR;

an information receiving unit, adapted to receive the second QoS information, radio bearer UBR information, and a second bearer ID; and an information storing unit, adapted to store the second QoS information, radio bearer UBR information, and the second bearer ID.

It can be seen from the above description that, by using the technical solution according to embodiments of the present invention, a complete bearer setup solution can be realized based on 3GPP R8 and the resources of each network element can also be utilized adequately.

BRIEF DESCRIPTION OF THE DRAWINGS

For better understanding of the technical solution according to the embodiments of the present invention or in the prior art, the following describes the accompanying drawings that are used in the embodiments of the present invention or in the prior art. Obviously, the following drawings are some exemplary embodiments of the present invention only. Those skilled in the art may obtain other drawings based on the following drawings without creative work.

FIG. 20 shows a structure of an SGSN according to an embodiment of the present invention; and FIG. 21 shows a structure of a UE according to an embodiment of the present invention.

DETAILED DESCRIPTION OF THE EMBODIMENTS

The technical solution of the embodiments of the present invention is hereinafter described in detail with reference to the accompanying drawings. It is evident that the embodiments are only exemplary embodiments of the present invention and the present invention is not limited to such embodiments. Other embodiments that those skilled in the art obtain based on embodiments of the present invention without creative work also fall in the scope of protection of the present invention.

Figure 1:
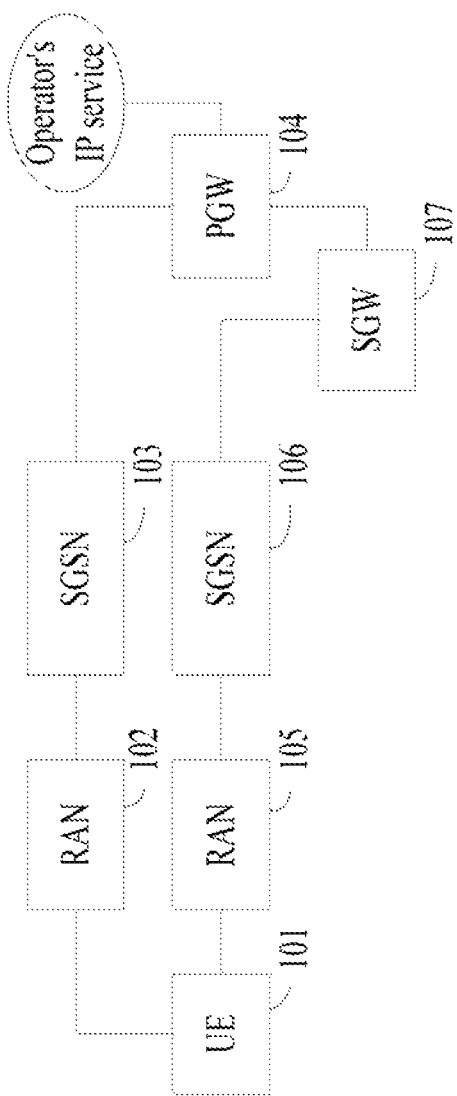
FIG. 1 shows an architecture of an SAE network in the prior art.
Figure 2:
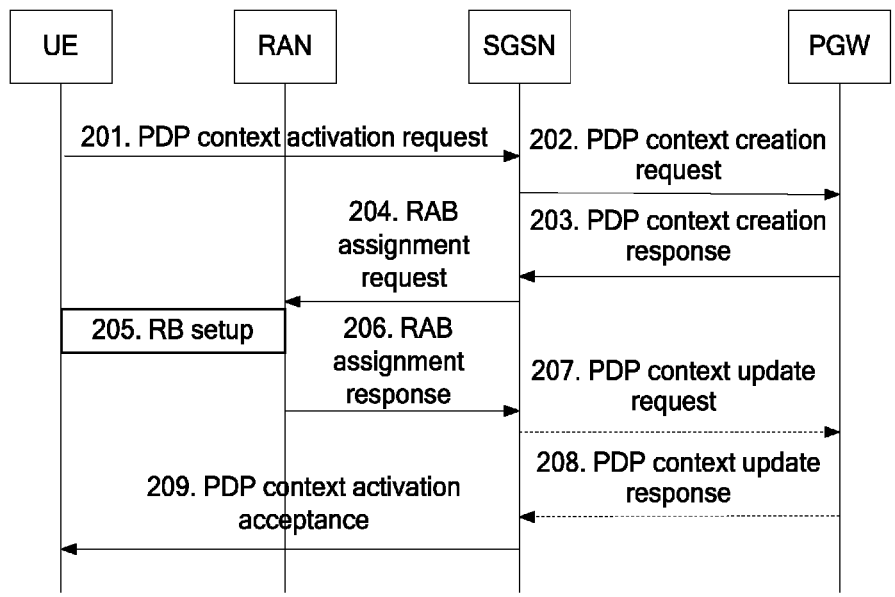
FIG. 2 is a flowchart of a method for setting up a bearer in the prior art.

FIG. 2 shows a conventional process of setting up a bearer between a UE and a PGW in which the SGSN is of 3GPP R7 or earlier versions. However, the SGSN of 3GPP R8 is connected to the PGW through the SGW so that the bearer setup solution in the prior art is not applicable to the SGSN of 3GPP R8. As a result, even if an SGSN of 3GPP R8 is available in the SAE system, it is impossible to set up a bearer between the UE and the PGW through such SGSN in the method shown in FIG. 2. Thus, the resources of network entities on the network cannot be fully utilized.

The following is based on an SGSN of 3GPP R8.

Figure 3:
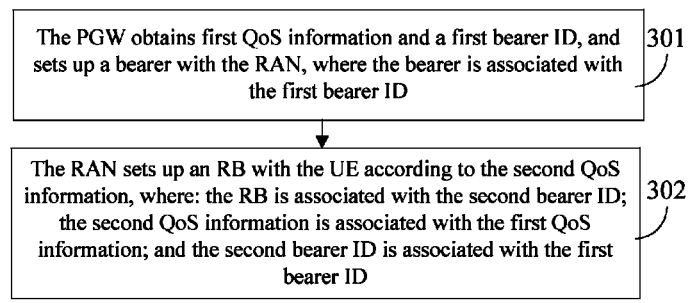
FIG. 3 is a flowchart of a method for setting up a bearer according to a first embodiment of the present invention.

FIG. 3 shows a method for setting up a bearer according to the first embodiment of the present invention. The method includes the following steps:

Step 301: The PGW obtains the first QoS information and a first bearer ID, and sets up a bearer between the RAN and the PGW according to the first QoS information, where the bearer is associated with the first bearer ID.

The PGW may set up a bearer between the PGW and the RAN directly or forward data between the PGW and the RAN through the SGW and/or SGSN when setting up the bearer between the PGW and the RAN. Specifically, the following cases may exist: (1) The PGW sets up a first bearer between the PGW and the SGW, and the SGW sets up a bearer between the SGW and the RAN. In this case, the SGSN forwards the data between the SGW and the RAN only; (2) The PGW sets up a bearer between the PGW and the SGSN, and the SGSN sets up a third bearer between the SGSN and the RAN. In this case, the SGW forwards the data between the PGW and the SGSN only; (3) The PGW sets up a bearer between the PGW and the UE. In this case, the SGW and the SGSN forward the data between the PGW and the UE; (4) The PGW sets up a first bearer between the PGW and the SGW, the SGW sets up a second bearer between the SGW and the SGSN, and the SGSN sets up a third bearer between the SGSN and the RAN.

Step 302: The RAN sets up an RB with the UE according to the second QoS information, where: the RB is associated with the second bearer ID; the second QoS information is associated with the first QoS information; and the second bearer ID is associated with the first bearer ID.

In practical applications, the UE and the PGW may use different QoS information. Thus, it is required to store the mapping relationship between the QoS information used by the UE and the QoS information used by the PGW in the SGSN, SGW or RAN, so that the UE and the PGW can identify related QoS information by mapping the QoS information during the data transmission. Alternatively, the UE or PGW may also store related mapping relationship in the UE or PGW. Similarly, the UE and the PGW may use different bearer IDs. Thus, it is required to store the mapping relationship between the bearer ID used by the UE and the bearer ID used by the PGW in the SGSN, SGW, or RAN, so that the HE and the PGW can identify related bearer IDs by mapping the bearer IDs during the data transmission. Alternatively, the UE or PGW may also store related mapping relationship in the UE or PGW.

The first embodiment is described supposing the SGSN stores related mapping relationship. The processes of storing the mapping relationship by other network entities such as the SGW are similar to the process of storing the mapping relationship by the SGSN, and will not be further described in the specification. It should be noted that, step 302 may also be executed before step 301, and step 302 and step 301 may also be executed at the same time.

Figure 4:
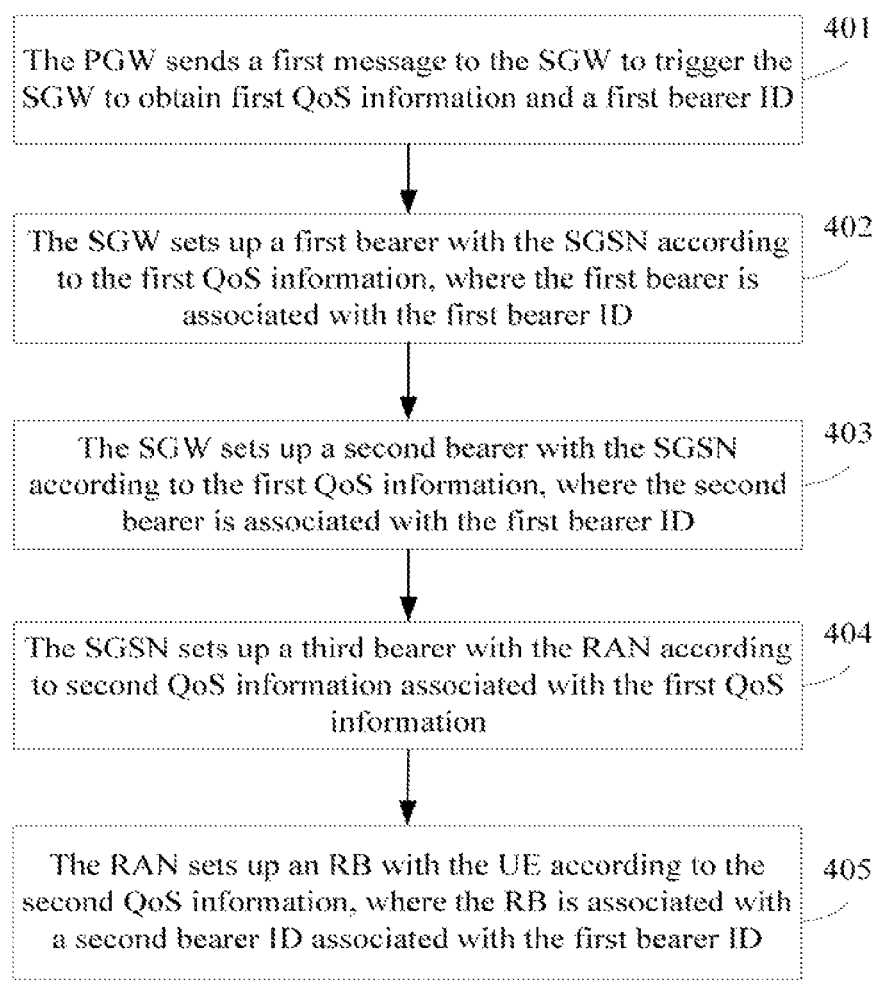
FIG. 4 is a flowchart of a method for setting up a bearer according to a second embodiment of the present invention.

FIG. 4 shows a method for setting up a bearer according to the second embodiment of the present invention. The method includes the following steps:

Step 401: The PGW sends a first message to the SGW to trigger the SGW to obtain first QoS information and a first bearer ID.

The PGW may send the first message actively to the SGW; for example, the PGW may be triggered by its own policy to send the first message. The PGW may also send the first message passively to the SGW; for example, the PGW may be triggered by a trigger message from other network entities that initiate bearer setup or triggered by a second message from the SGW, MME or SGSN to send the first message. Similarly, the SGW may send the second message in an active or passive manner; for example, the SGW may be triggered by a third message from the SGSN to send the second message. The SGSN may also send the third message in an active or passive manner, for example, the SGSN may be triggered by a fourth message from the UE to send the third message.

If the first message includes the first QoS information, the SGW may obtain the first QoS information from the first message directly. If the first QoS information is stored in the SGW, the SGW may obtain the first QoS information from the SGW directly. If the first QoS information is stored in other network entities, the SGW may obtain the first QoS information from the network entities that store the first QoS information by exchanging messages.

The process of obtaining the first bearer ID is similar to that of obtaining the first QoS information. The first QoS information and the first bearer ID may be obtained from different network entities or by different means.

Step 402: The SGW sets up a first bearer between the SGW and the PGW according to the first QoS information, where the first bearer is associated with the first bearer ID.

The following describes the process of setting up the first bearer between the SGW and the PGW by the SGW according to the first QoS information.

The SGW allocates a first DBR for the first bearer according to the first QoS information, and sends the first QoS information, the first bearer ID and information about the first DBR to the PGW; the PGW stores the information about the first DBR. If the PGW has already allocated the first UBR according to the first QoS information and sent the information about the first UBR to the SGW for storing, the setup of the first bearer ends. If the PGW has not allocate the first UBR according to the first QoS information, the PGW allocates the first UBR according to the first QoS information, and sends the first QoS information, the first bearer ID and information about the first UBR to the SGW; the SGW stores the information about the first UBR; then, the setup of the first bearer ends.

The allocated DBR or UBR may be user plane resources. After the bearer is set up, the user plane data may be transmitted through the allocated UBR and DBR.

Step 403: The SGW sets up a second bearer between the SGW and the SGSN according to the first QoS information, where the second bearer is associated with the first bearer ID.

The following describes the process of setting up the second bearer between the SGW and the SGSN by the SGW according to the first QoS information.

The SGW allocates a second UBR for the second bearer, and sends the first QoS information, the first bearer ID and information about the second UBR to the SGSN.

The SGSN stores the information about the second UBR. If the SGSN has already allocated a second DBR according to the first QoS information and sent the information about the second DBR to the SGW for storing, the setup of the second bearer ends.

If the SGSN has not allocated a second DBR according to the first QoS information, the SGSN allocates a second DBR according to the first QoS information, and sends the first QoS information, the first bearer ID and information about the second DBR to the SGW; the SGW stores the information about the second DBR; then, the setup of the second bearer ends.

Step 404: The SGSN sets up a third bearer between the SGSN and the RAN according to the second QoS information associated with the first QoS information, where the third bearer is associated with the second bearer ID.

Step 405: The RAN sets up an RB with the UE according to the second QoS information, where the RB is associated with the second bearer ID which is associated with the first bearer ID.

It is understandable that, because the second bearer ID is obtained by mapping the first bearer ID, the first bearer ID is associated with the second bearer ID on a one-to-one basis.

Thus, the bearer is associated with the second bearer ID as well as with the first bearer ID. Similarly, the first QoS information is associated with the second QoS information. In fact, the first QoS information and the second QoS information are the same and only the expression forms are different.

It should be noted that the preceding bearers may be set up in a random sequence. The preceding embodiment describes only one case. In practical applications, the bearers may be set up in any sequence or at the same time.

The process of setting up the third bearer between the SGSN and the RAN by the SGSN according to the second QoS information associated with the first QoS information is as follows: The SGSN allocates a third UBR for the third bearer according to the second QoS information, and sends the second QoS information, second bearer ID associated with the first bearer ID and information about the third UBR to the RAN; the RAN stores the information about the third UBR, allocates a third DBR according to the second QoS information, and sends the information about the third DBR to the SGSN; the SGSN stores the information about the third DBR; then the setup of the third bearer ends. During the setup of the third bearer, the RAN may set up an RB with the UE according to the second QoS information, where the RB is associated with the second bearer ID which is associated with the first bearer ID.

If the RAN and the SGW use the same type of QoS information and bearer IDs, the first QoS information and the second QoS information are the same and so are the first bearer ID and the second bearer ID. If the RAN and the SGW use different versions of QoS information, the mapping relationship between the QoS information needs to be stored in the SGSN. Thus, the first QoS information used in the SGW may be mapped into the second QoS information used in the RAN according to such mapping relationship. For example, the QoS information of R8 used in the SGW is mapped into the QoS information of R7 used in the RAN. Similarly, if the RAN and the SGW use different bearer IDs, the mapping relationship between the bearer IDs needs to be stored in the SGSN. Thus, the first bearer ID used in the SGW may be mapped into the second bearer ID used in the RAN according to such mapping relationship. For example, the bearer ID used in the SGW is mapped into a network layer service access point identifier (NSAPI) used in the RAN.

In practical applications, the RAN may set up an RB with the UE through the following process: The RAN sends the second QoS information and second bearer ID to the UE; the UE allocates a first radio bearer DBR according to the QoS information, and sends the QoS information based on which the first radio bearer DBR is allocated, second bearer ID, and information about the first radio bearer DBR to the RAN; the RAN stores the information about the first radio bearer DBR, allocates a first radio bearer UBR according to the QoS information based on which the first radio bearer DBR is allocated, and sends such QoS information, second bearer ID, and the information about the first radio bearer UBR to the UE; and the UE stores the information about the first radio bearer UBR; then the RB is set up.

Because resources that the UE can allocate are unknown to the network, the UE may not allocate resources required by the second QoS, even though the second QoS information is sent to the UE. After receiving the second QoS information, the UE needs to judge whether the first radio bearer DBR can be allocated for the RB according to the second QoS information. If the first radio bearer DBR can be allocated for the RB according to the second QoS information, the UE sets up an RB according to the second QoS information; otherwise the UE needs to determine third QoS information according to its own resources, and sets up an RB according to the third QoS information.

When the UE sets up an RB by using the third QoS information, the SGW needs to set up a second bearer and a first bearer according to fourth QoS information associated with the third QoS information. If the second bearer and the first bearer are already set up, the SGW needs to re-set up a second bearer and a first bearer according to the fourth QoS information. That is, the SGW needs to update the second bearer and the first bearer, so that the second bearer and the first bearer can meet the requirement of the fourth QoS information.

It can be know from the process described above that, according to embodiments of the present invention, the SGSN of 3GPP R8 may be directly connected to the SGW. A bearer between the UE and the PGW may be set up through communications between the SGW and the PGW, so that resources of each network entity can be fully utilized.

In practical applications, multiple bearers may be set up between a same UE and a same PGW. In this case, transmitted data streams may be correlated with a bearer through an ID which is associated with the bearer. Practically, if a traffic flow template (TFT) is used, the process is as follows:

The PGW may allocate an uplink TFT associated with the bearer, and sends the uplink TFT to the UE during the bearer setup process. Similarly, the UE may allocate a downlink TFT, and sends the downlink TFT to the PGW during the bearer setup process.

It can known from the preceding description that, the setup of a bearer between the UE and the PGW may be triggered by any network entity in the network, for example, the PGW, UE, SGW, or PGW. The following describes the preceding cases:

1. Bearer Setup Triggered by the PGW

Figure 5:
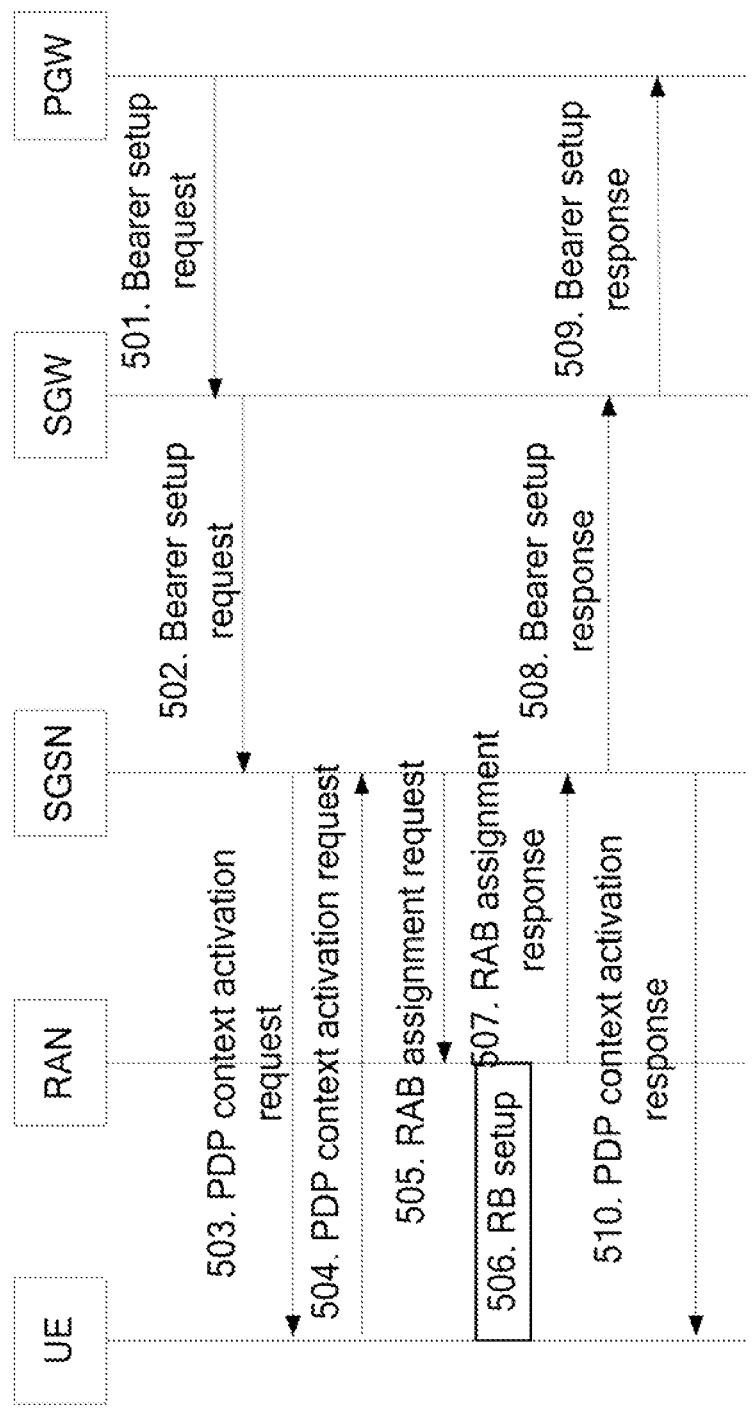
FIG. 5 is a flowchart of a method for setting up a bearer according to a third embodiment of the present invention.

FIG. 5 shows a method for setting up a bearer according to the third embodiment of the present invention. This method concerns bearer setup triggered by the PGW. Bearer setup may be triggered through some trigger messages, for example, trigger messages from downstream nodes such as the SGW, SGSN, RAN, and UE, trigger messages from other system related nodes such as the MME, trigger messages from upstream nodes such as a policy and charging rules function (PCRF), or bearer setup may be triggered by the PGW. The process includes the following steps:

Step 501: The PGW sends a bearer setup request to the SGW.

After obtaining the first QoS information from the PGW or other network nodes, the PGW allocates a first UBR for the first bearer between the PGW and the SGW according to the first QoS information, and sends a bearer setup request to the SGW, where the bearer setup request may include information about the first UBR, the first QoS information and a first bearer ID, or further include uplink TFT information.

Step 502: The SGW sends a bearer setup request to the SGSN.

After receiving the bearer setup request from the PGW, the SGW stores required information, such as information about the first UBR, the first QoS information and the first bearer ID.

The SGW allocates a second UBR for the second bearer between the SGW and the SGSN according to the first QoS information, and sends a bearer setup request to the SGSN, where the bearer setup request may include information about the second UBR, the first QoS information and the first bearer ID, or further include uplink TFT information if the SGW has already obtained an uplink TFT.

Step 503: The SGSN sends a packet data protocol (PDP) context activation request to the UE.

The SGSN sends a PDP context activation request to the UE, where the request may include QoS information, uplink TFT information and a bearer ID. In the SGSN, the mapping between QoS information and mapping between bearer IDs may be performed. If such mapping is performed, the QoS information included in the PDP context activation request is the second QoS information mapped from the first QoS information, and the bearer ID included in the PDP context activation request is the second bearer ID mapped from the first bearer ID. If such mapping is not performed yet, the QoS information included in the PDP context activation request is the first QoS information, and the bearer ID included in the PDP context activation request is the first bearer ID.

Step 504: The UE sends a PDP context activation request to the SGSN.

After receiving the PDP context activation request, the UE may store required information, such as QoS information and bearer ID. If the request includes an uplink TFT, the UE may correlate the uplink TFT with the bearer; the UE sends a PDP context activation request carrying QoS information to the SGSN, where the QoS information may be the third QoS information re-selected by the UE or the second QoS information. If the uplink TFT is received, the request may further carry a downlink TFT associated with the uplink TFT.

Step 505: The SGSN sends a radio access bearer (RAB) assignment request to the RAN.

Step 506: The RAN sets up an RB with the UE.

Step 507: The RAN returns an RAB assignment response to the SGSN.

Steps 505, 506, and 507 are similar to steps 204, 205 and 206, and will not be further described.

Step 508: The SGSN returns a bearer setup response to the SGW.

The SGSN allocates a second DBR for the second bearer according to the first QoS information, which may not occur in practical applications. For example, when the UE allocates downlink RB resources according to the third QoS information rather than the second QoS information associated with the first QoS information, the SGSN may allocate a second DBR according to fourth QoS information associated with the third QoS information; the SGSN returns a bearer setup response to the SGW, where the response may include the first QoS information, first bearer ID and information about the second DBR. If the SGSN receives a downlink TFT from the UE, the response may further include the downlink TFT.

Step 509: The SGW returns a bearer setup response to the PGW.

After receiving the bearer setup response from the SGSN, the SGW stores related information, such as first QoS information, first bearer ID and information about the second DBR, and allocates a first DBR for the first bearer according to the first QoS information, which may also not occur in practical applications; the SGW returns a bearer setup response to the PGW, where the response may include the first QoS information, first bearer ID and information about the first DBR. If the SGW receives a downlink TFT from the SGSN, the response may further include the downlink TFT.

Step 510: The SGSN returns a PDP context activation response to the UE.

After receiving the RAB assignment response from the RAN, the SGSN may return a PDP context activation response to the UE, notifying the UE that bearer setup is completed.

It should be noted that FIG. 5 describes only one of the implementation modes. In practical applications, the sequence of steps may be changed. For example, step 508, step 510 and step 507 may be performed in any sequence or at the same time.

In this embodiment, when the SGSN of 3GPP R8 is connected to the SGW directly, the setup of the bearer between the UE and the PGW is triggered by the PGW through communications between the SGW and the PGW. Thus, resources of each network entity in the network are fully utilized.

Figure 6:
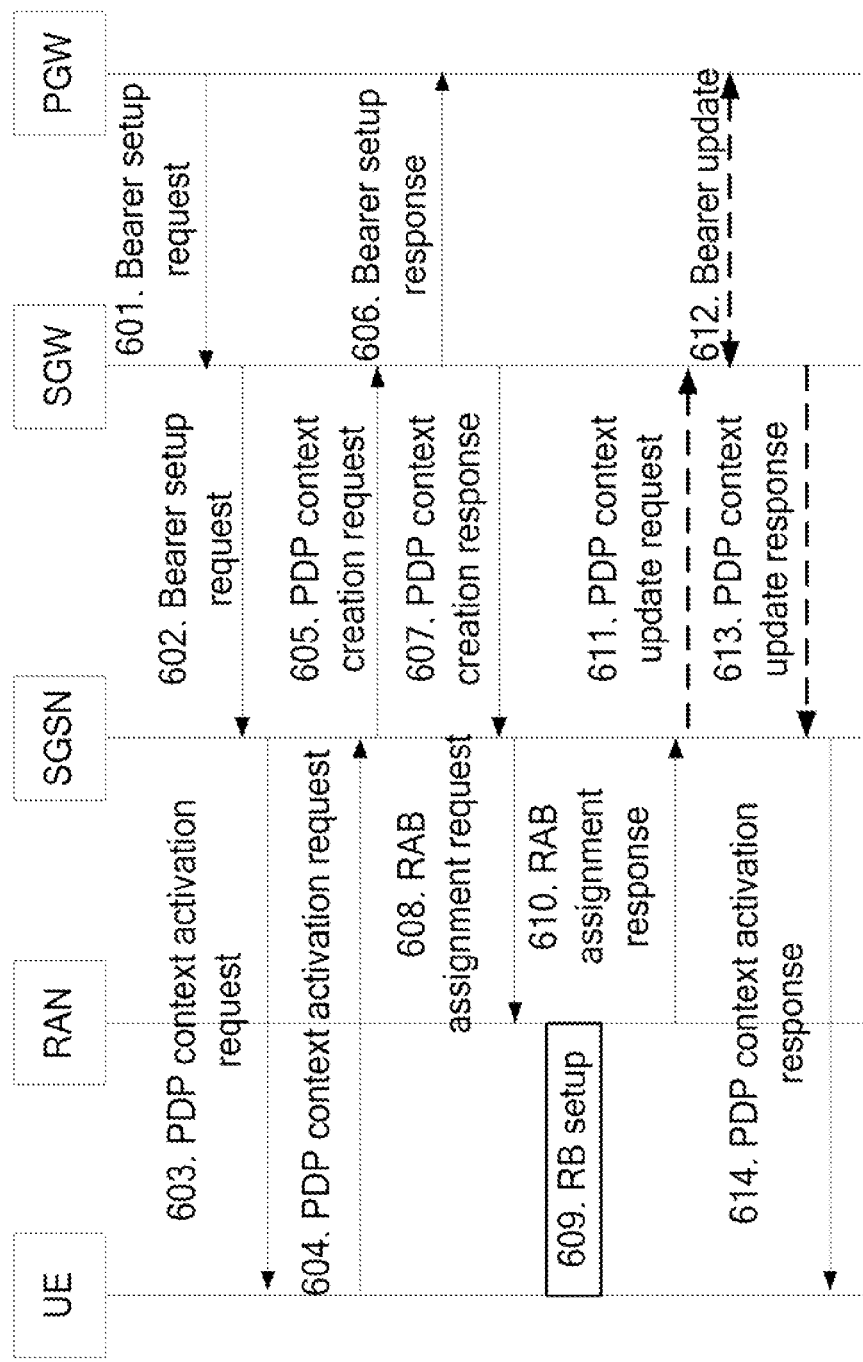
FIG. 6 is a flowchart of a method for setting up a bearer according to a fourth embodiment of the present invention.

FIG. 6 shows a method for setting up a bearer according to the fourth embodiment of the present invention. This method concerns bearer setup triggered by the PGW, and includes the following steps:

Step 601: The PGW sends a bearer setup request to the SGW.

Then, the setup of a first bearer begins.

Step 602: The SGW sends a bearer setup request to the SGSN.

Step 603: The SGSN sends a PDP context activation request to the UE.

Step 604: The UE sends a PDP context activation request to the SGSN.

Step 605: The SGSN sends a PDP context creation request to the SGW.

The setup of a second bearer begins. The SGSN allocates a second DBR for the second bearer, and sends the information about the second DBR, first QoS information and the first bearer ID to the SGW through the PDP context creation request.

Step 606: The SGW returns a bearer setup response to the PGW.

Then, the setup of the first bearer ends.

Step 607: The SGW returns a PDP context creation response to the SGSN.

After receiving the PDP context creation request, the SGW stores related information, allocates a second UBR for the second bearer, and sends the information about the second UBR, first QoS information and first bearer ID to the SGW through the PDP context creation response; the SGW stores related information. Then, the setup of the second bearer ends.

Step 608: The SGSN sends an RAB assignment request to the RAN.

Then, the setup of a third bearer begins.

Step 609: The RAN sets up an RB with the UE.

Step 610: The RAN returns an RAB assignment response to the SGSN.

Then, the setup of the third bearer ends.

Step 611: The SGSN sends a PDP context update request to the SGW.

If the third bearer between the SGSN and the RAN uses the third QoS information selected by the UE, the SGSN may re-allocate a second DBR according to the fourth QoS information associated with the third QoS information, and send a PDP context update request that carries the information of the re-allocated second DBR, fourth QoS information, and first bearer ID to the SGW to trigger the SGW to re-allocate a second UBR and update the current second bearer.

Step 612: The SGW sends a bearer update message to the PGW.

The SGW further sends a bearer update message to the PGW to update the first bearer.

Step 613: The SGW returns a PDP context update response to the SGSN.

The SGW stores related information, and notifies the SGSN through the PDP context update response after re-allocating the second UBR according to the fourth QoS information; after the SGSN stores related information again, the update of the second bearer ends.

Step 614: The SGSN returns a PDP context activation response to the UE.

In this embodiment, when the SGSN of 3GPP R8 is connected to the SGW directly, the setup of the bearer between the UE and the PGW may be triggered through communications between the SGW and the PGW. Thus, resources of each network entity in the network are fully utilized.

Figure 7:
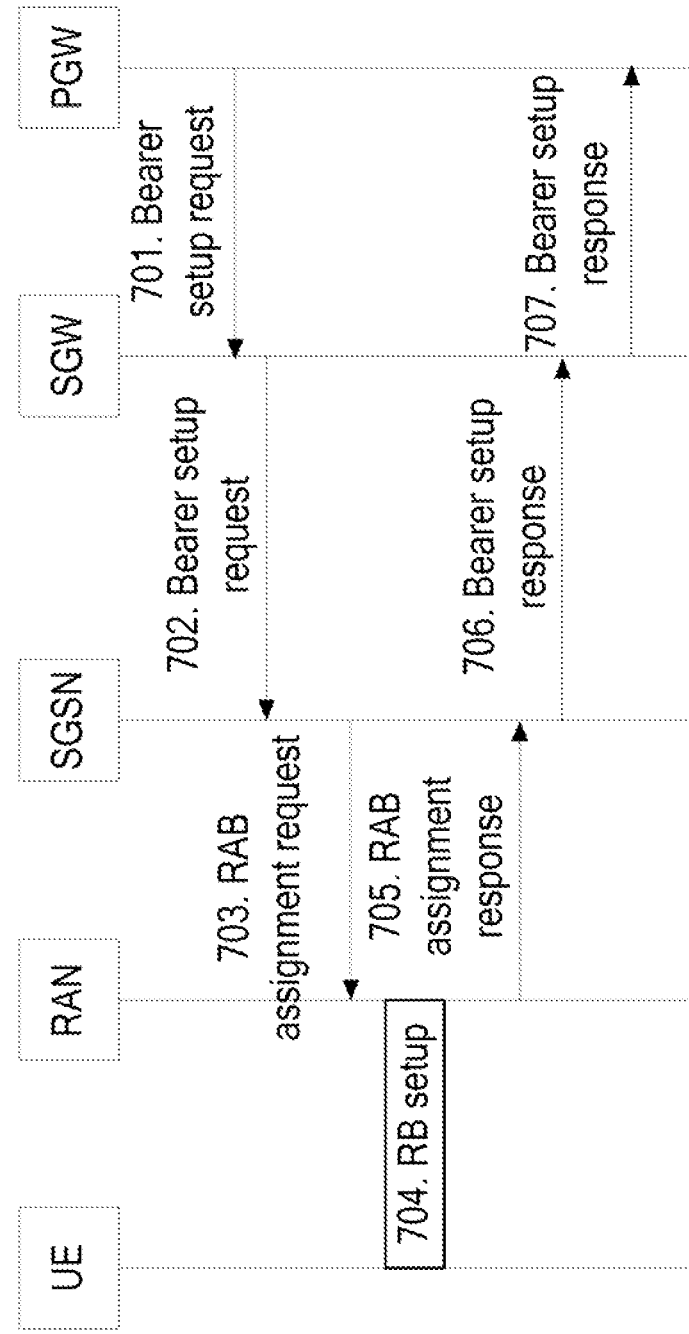
FIG. 7 is a flowchart of a method for setting up a bearer according to a fifth embodiment of the present invention.

FIG. 7 shows a method for setting up a bearer according to the fifth embodiment of the present invention. This method concerns bearer setup triggered by the PGW, and includes the following steps:

Step 701: The PGW sends a bearer setup request to the SGW.

Then, the setup of a first bearer begins.

Step 702: The SGW sends a bearer setup request to the SGSN.

Then, the setup of a second bearer begins.

Step 703: The SGSN sends an RAB assignment request to the RAN.

Then, the setup of a third bearer begins.

Step 704: The RAN sets up an RB with the UE.

Step 705: The RAN returns an RAB assignment response to the SGSN.

Then, the setup of the third bearer ends.

Step 706: The SGSN returns a bearer setup response to the SGW.

Then, the setup of the second bearer ends.

Step 707: The SGW returns a bearer setup response to the PGW.

Then, the setup of the first bearer ends.

In this embodiment, when the SGSN of 3GPP R8 is connected to the SGW directly, the setup of the bearer between the UE and the PGW may be triggered by the PGW through communications between the SGW and the PGW. Thus, resources of each network entity in the network are fully utilized.

2. Bearer Setup Triggered by the UE

Figure 8:
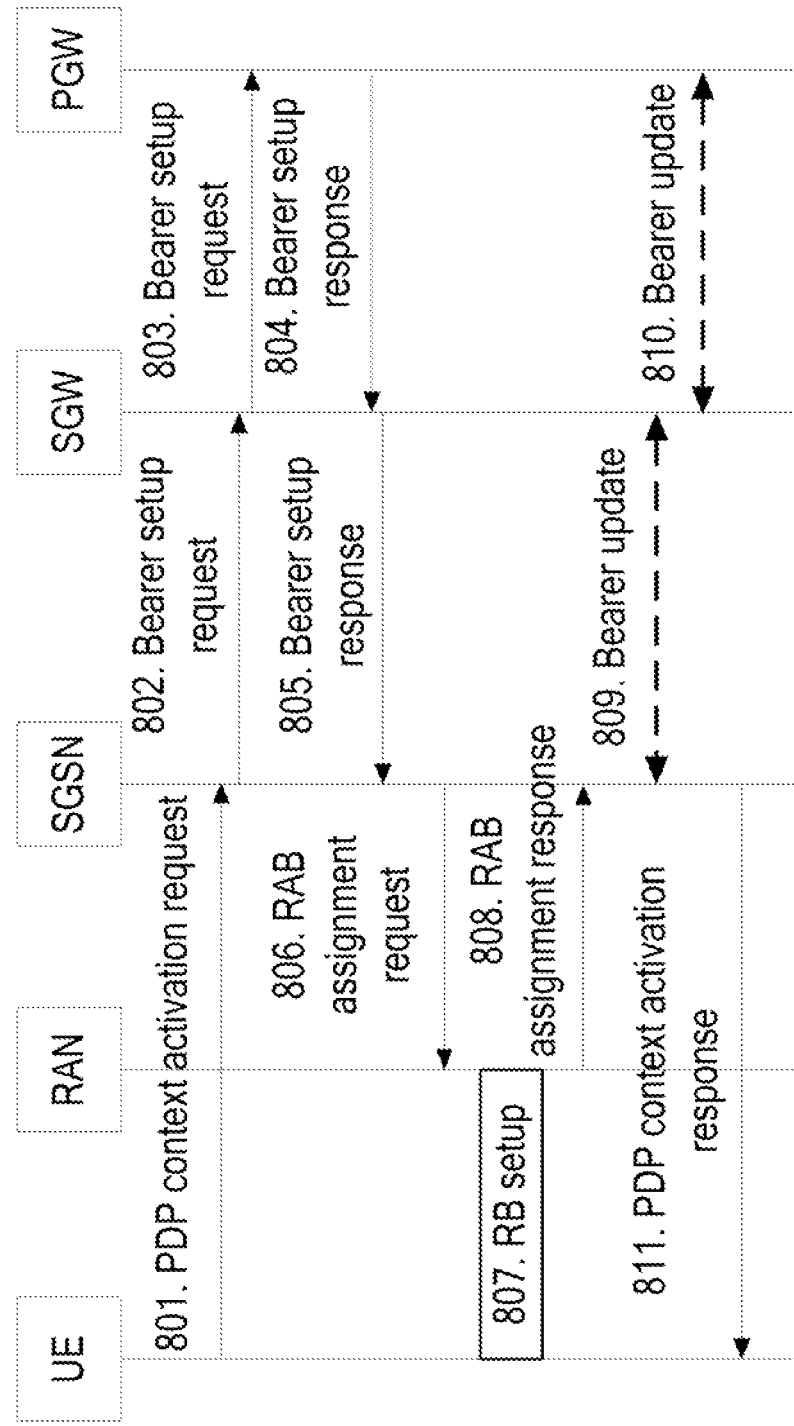
FIG. 8 is a flowchart of a method for setting up a bearer according to a sixth embodiment of the present invention.

FIG. 8 shows a method for setting up a bearer according to the sixth embodiment of the present invention. This method concerns bearer setup triggered by the UE, and includes the following steps:

Step 801: The UE sends a PDP context activation request to the SGSN.

The UE is triggered by its own policy or other network entities to initiate bearer setup, and sends a third trigger message to the SGSN, where the third trigger message may be a PDP context activation request, which may include any of the second QoS information, second bearer ID and downlink TFT or any combination thereof or none of the preceding information.

Step 802: The SGSN sends a bearer setup request to the SGW.

After obtaining the first QoS information and first bearer ID, the SGSN allocates a second DBR according to the first QoS information. Then, the setup of a second bearer begins.

Step 803: The SGW sends a bearer setup request to the PGW.

Then, the setup of a first bearer begins.

Step 804: The PGW returns a bearer setup response to the SGW.

Then, the setup of the first bearer ends.

Step 805: The SGW returns a bearer setup response to the SGSN.

Then, the setup of the second bearer ends.

Step 806: The SGSN sends an RAB assignment request to the RAN.

Then, the setup of a third bearer begins.

Step 807: The RAN sets up an RB with the UE.

Step 808: The RAN returns an RAB assignment response to the SGSN.

Step 809: The SGSN sends a bearer update message to the SGW.

If the third bearer is set up by using the third QoS information determined by the UE, the second bearer needs to be updated.

Step 810: The SGW sends a bearer update message to the PGW.

If the third bearer is set up by using the third QoS information determined by the UE, the first bearer needs to be updated. Step 809 and step 810 may be performed in any sequence or at the same time.

Step 811: The SGSN returns a PDP context activation response to the UE.

Then, the setup of the third bearer ends.

In this embodiment, when the SGSN of 3GPP R8 is connected to the SGW directly, the setup of the bearer between the UE and the PGW is triggered by the UE through communications between the SGW and the PGW. Thus, resources of each network entity in the network are fully utilized.

Figure 9:
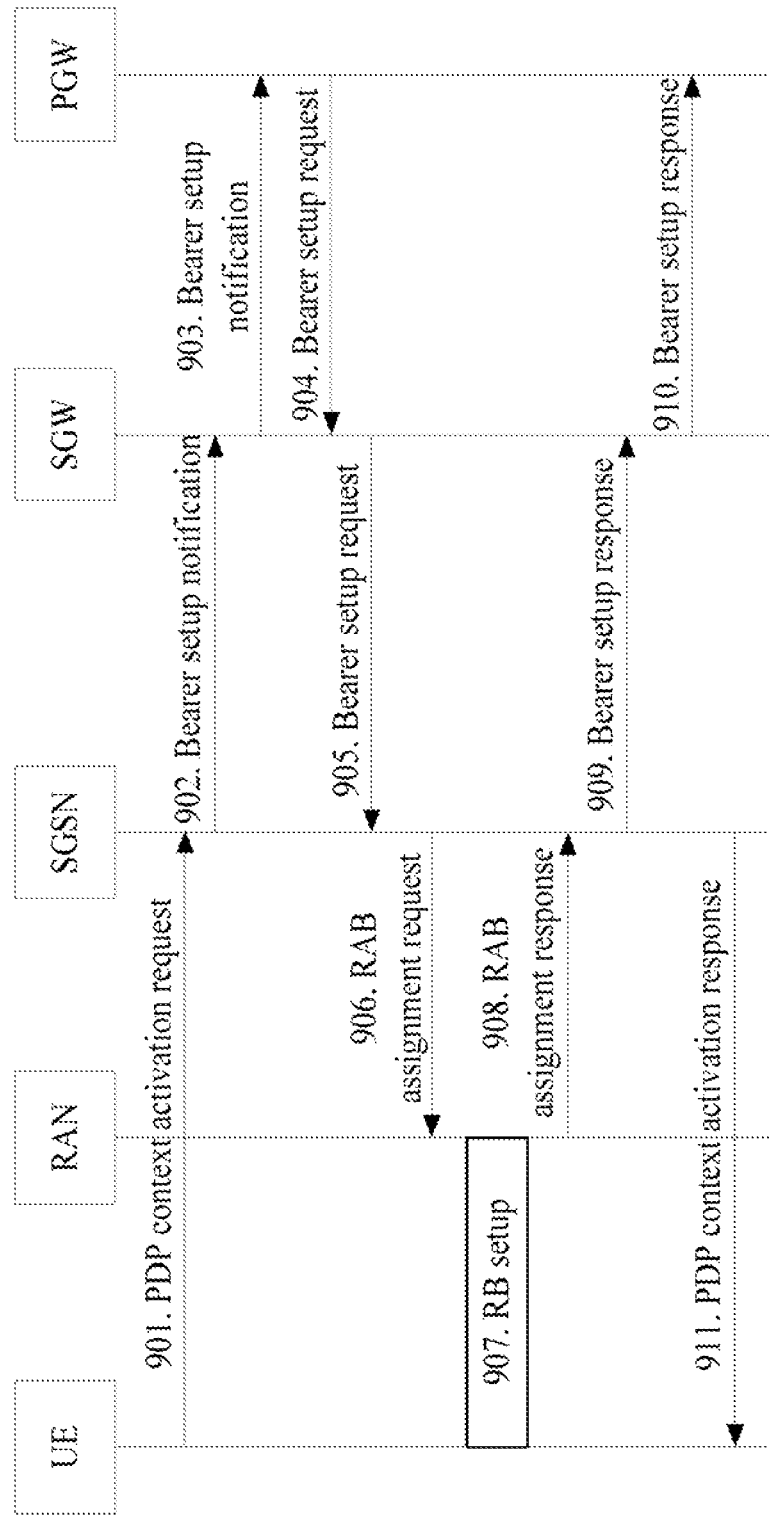
FIG. 9 is a flowchart of a method for setting up a bearer according to a seventh embodiment of the present invention.

FIG. 9 shows a method for setting up a bearer according to the seventh embodiment of the present invention. This method concerns bearer setup triggered by the UE, and includes the following steps:

Step 901: The UE sends a PDP context activation request to the SGSN.

The request may include any of the second QoS information, second bearer ID and downlink TFT or any combination thereof or none of the preceding information.

Step 902: The SGSN sends a bearer setup notification to the SGW.

The notification may include any of the second QoS information, first bearer ID and downlink TFT or any combination thereof or none of the preceding information.

Step 903: The SGW sends a bearer setup notification to the PGW.

The notification may include any of the second QoS information, first bearer ID and downlink TFT or any combination thereof or none of the preceding information.

Step 904: The PGW sends a bearer setup request to the SGW.

After the PGW obtains the first QoS information and first bearer ID, the setup of a first bearer begins.

Step 905: The SGW sends a bearer setup request to the SGSN.

Then, the setup of a second bearer begins.

Step 906: The SGSN sends an RAB assignment request to the RAN.

Then, the setup of a third bearer begins.

Step 907: The RAN sets up an RB with the UE.

Step 908: The RAN returns an RAB assignment response to the SGSN.

Then, the setup of the third bearer ends.

Step 909: The SGSN returns a bearer setup response to the SGW.

Then, the setup of the second bearer ends.

Step 910: The SGW returns a bearer setup response to the PGW.

Then, the setup of the first bearer ends. Step 909 and step 910 may be performed in any sequence or at the same time.

Step 911: The SGSN returns a PDP context activation response to the UE.

In this embodiment, when the SGSN of 3GPP R8 is connected to the SGW directly, the setup of the bearer between the UE and the PGW is triggered by the UE through communications between the SGW and the PGW. Thus, resources of each network entity in the network are fully utilized.

Figure 10:
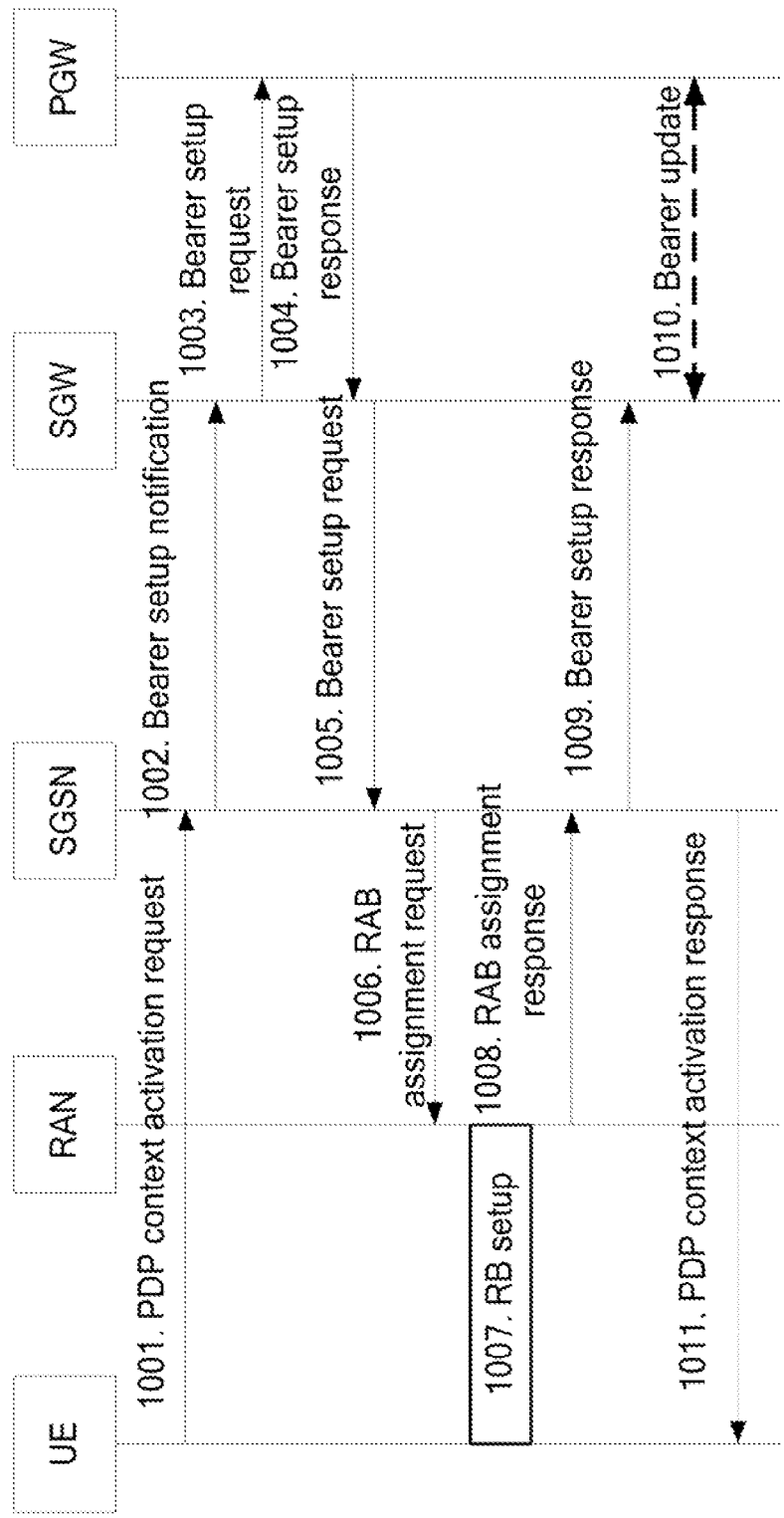
FIG. 10 is a flowchart of a method for setting up a bearer according to an eighth embodiment of the present invention.

FIG. 10 shows a method for setting up a bearer according to the eighth embodiment of the present invention. This method concerns bearer setup triggered by the UE, and includes the following steps:

Step 1001: The UE sends a PDP context activation request to the SGSN.

Step 1002: The SGSN sends a bearer setup notification to the SGW.

Step 1003: The SGW sends a bearer setup request to the PGW.

After the SGW obtains the first QoS information and first bearer ID, the setup of a first bearer begins.

Step 1004: The PGW returns a bearer setup response to the SGW.

Then, the setup of the first bearer ends.

Step 1005: The SGW sends a bearer setup request to the SGSN.

Then, the setup of a second bearer begins.

Step 1006: The SGSN sends an RAB assignment request to the RAN.

Then, the setup of a third bearer begins.

Step 1007: The RAN sets up an RB with the UE.

Step 1008: The RAN returns an RAB assignment response to the SGSN.

Then, the setup of the third bearer ends.

Step 1009: The SGSN sends a bearer setup response to the SGW.

Then, the setup of the second bearer ends.

Step 1010: The SGW sends a bearer update message to the PGW. Step 1009 and step 1010 may be performed in any sequence or at the same time.

Step 1011: The SGSN returns a PDP context activation response to the UE.

If the third bearer and the second bearer are set up by using QoS information different from the first bearer, the first bearer needs to be updated.

In this embodiment, when the SGSN of 3GPP R8 is connected to the SGW directly, the setup of the bearer between the UE and the PGW is triggered by the UE through communications between the SGW and the PGW. Thus, resources of each network entity in the network are fully utilized.

Figure 11:
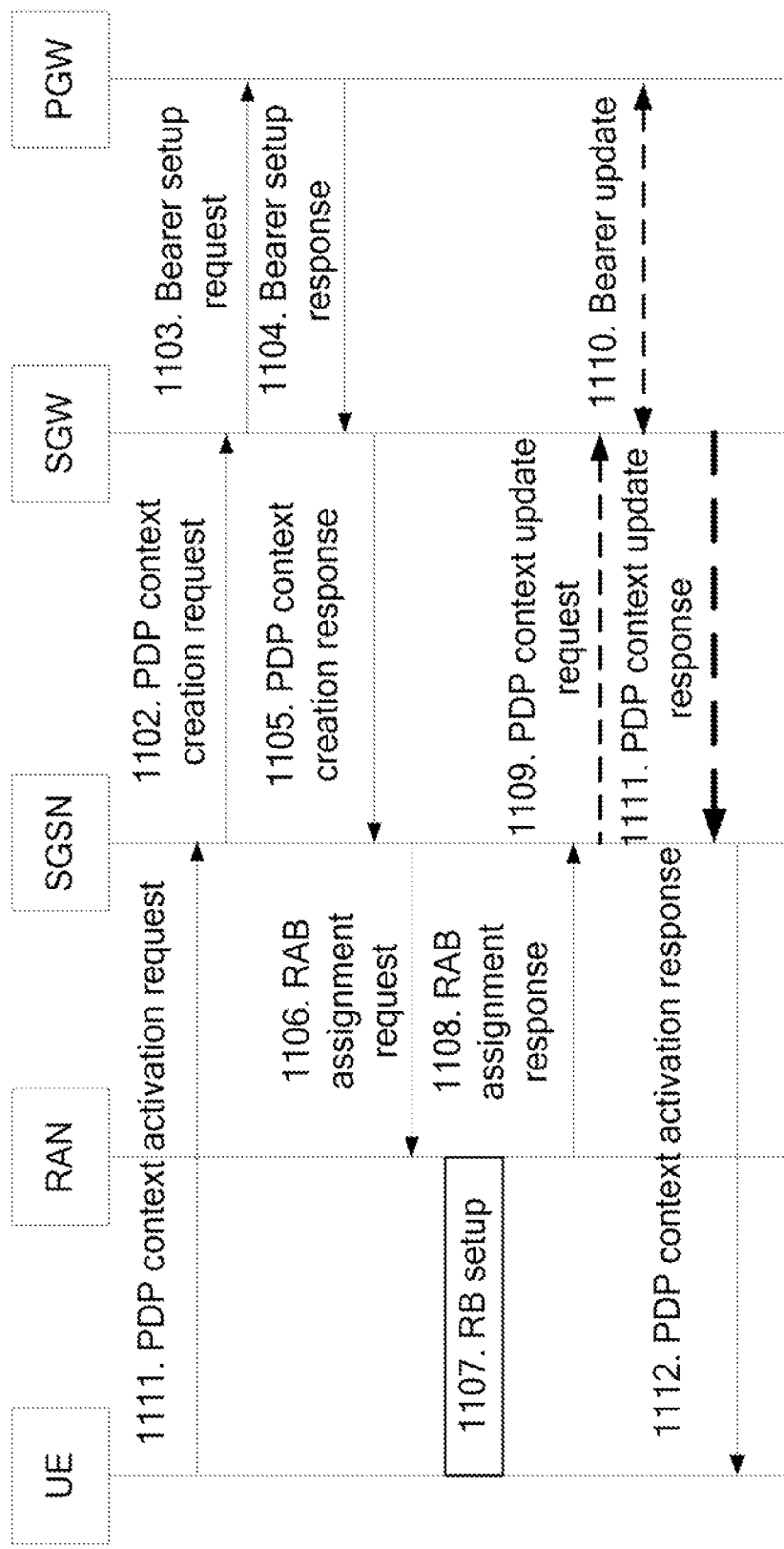
FIG. 11 is a flowchart of a method for setting up a bearer according to a ninth embodiment of the present invention.

FIG. 11 shows a method for setting up a bearer according to the ninth embodiment of the present invention. This method concerns bearer setup triggered by the UE, and includes the following steps:

Step 1101: The UE sends a PDP context activation request to the SGSN.

Step 1102: The SGSN sends a PDP context creation request to the SGW.

After the SGSN obtains the first QoS information and first bearer ID, the setup of a second bearer begins.

Step 1103: The SGW sends a bearer setup request to the PGW.

Then, the setup of a first bearer begins.

Step 1104: The PGW returns a bearer setup response to the SGW.

Then, the setup of the first bearer ends.

Step 1105: The SGW returns a PDP context creation response to the SGSN.

Then, the setup of the second bearer ends:

Step 1106: The SGSN sends an RAB assignment request to the RAN.

Then, the setup of a third bearer begins.

Step 1107: The RAN sets up an RB with the UE.

Step 1108: The RAN returns an RAB assignment response to the SGSN.

Then, the setup of the third bearer ends.

Step 1109: The SGSN sends a PDP context update request to the SGW.

If the third bearer is set up by using the third QoS information determined by the UE, the second bearer that is already set up needs to be updated.

Step 1110: The SGW sends a bearer update message to the PGW.

If the third bearer is set up by using the third QoS information determined by the UE, the first bearer that is already set up needs to be updated.

Step 1111: The SGW returns a PDP context update response to the SGSN.

Then, the update of the second bearer ends.

Step 1112: The SGSN returns a POP context activation response to the UE.

In this embodiment, when the SGSN of 3GPP R8 is connected to the SGW directly, the setup of the bearer between the UE and the PGW is triggered by the UE through communications between the SGW and the PGW. Thus, resources of each network entity in the network are fully utilized.

Figure 12:
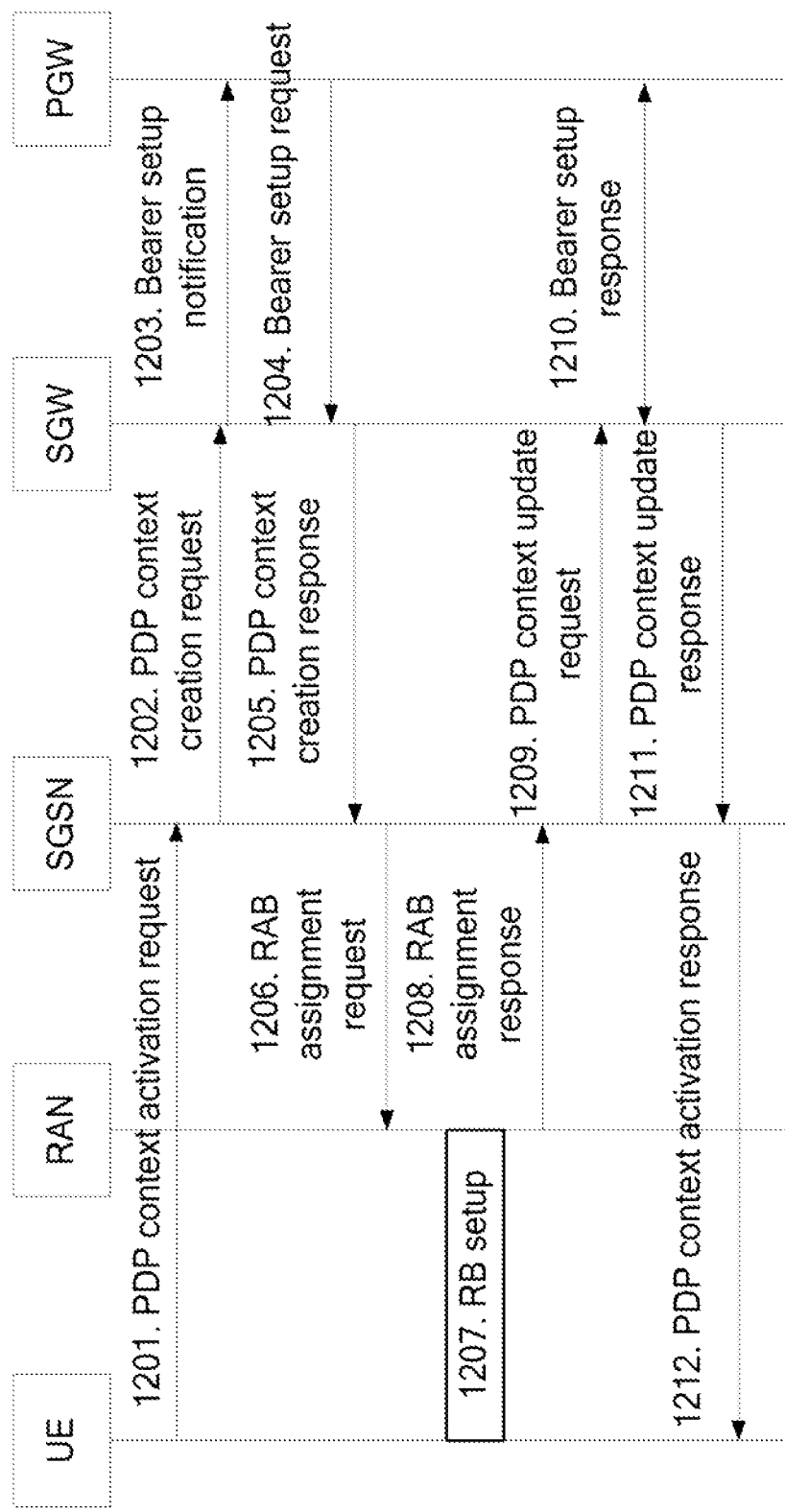
FIG. 12 is a flowchart of a method for setting up a bearer according to a tenth embodiment of the present invention.

FIG. 12 shows a method for setting up a bearer according to the tenth embodiment of the present invention. This method concerns bearer setup triggered by the UE, and includes the following steps:

Step 1201: The UE sends a PDP context activation request to the SGSN.

Step 1202: The SGSN sends a PDP context creation request to the SGW.

Then, the setup of a second bearer begins.

Step 1203: The SGW sends a bearer setup notification to the PGW.

The notification may carry the first QoS information and the first bearer ID.

Step 1204: The PGW sends a bearer setup request to the SGW.

Then, the setup of a first bearer begins.

Step 1205: The SGW returns a PDP context creation response to the SGSN.

Then, the setup of the second bearer ends.

Step 1206: The SGSN sends an RAB assignment request to the RAN.

Then, the setup of a third bearer begins.

Step 1207: The RAN sets up an RB with the UE.

Step 1208: The RAN returns an RAB assignment response to the SGSN.

Then, the setup of the third bearer ends.

Step 1209: The SGSN sends a PDP context update request to the SGW.

If the third bearer is set up by using the third QoS information determined by the UE, the second bearer that is already set up needs to be updated.

Step 1210: The SGW sends a bearer setup response to the PGW.

The response may carry the fourth QoS information. Thus, after receiving the response, the PGW may re-allocate a first UBR; after the SGW receives the information of the re-allocated first UBR, the setup of the first bearer ends.

Step 1211: The SGW returns a PDP context update response to the SGSN.

Then, the update of the second bearer ends.

Step 1212: The SGSN returns a PDP context activation response to the UE.

In this embodiment, when the SGSN of 3GPP R8 is connected to the SGW directly, the setup of the bearer between the UE and the PGW is triggered by the UE through communications between the SGW and the PGW. Thus, resources of each network entity in the network are fully utilized.

3. Bearer Setup Triggered by the SGW

Figure 13:
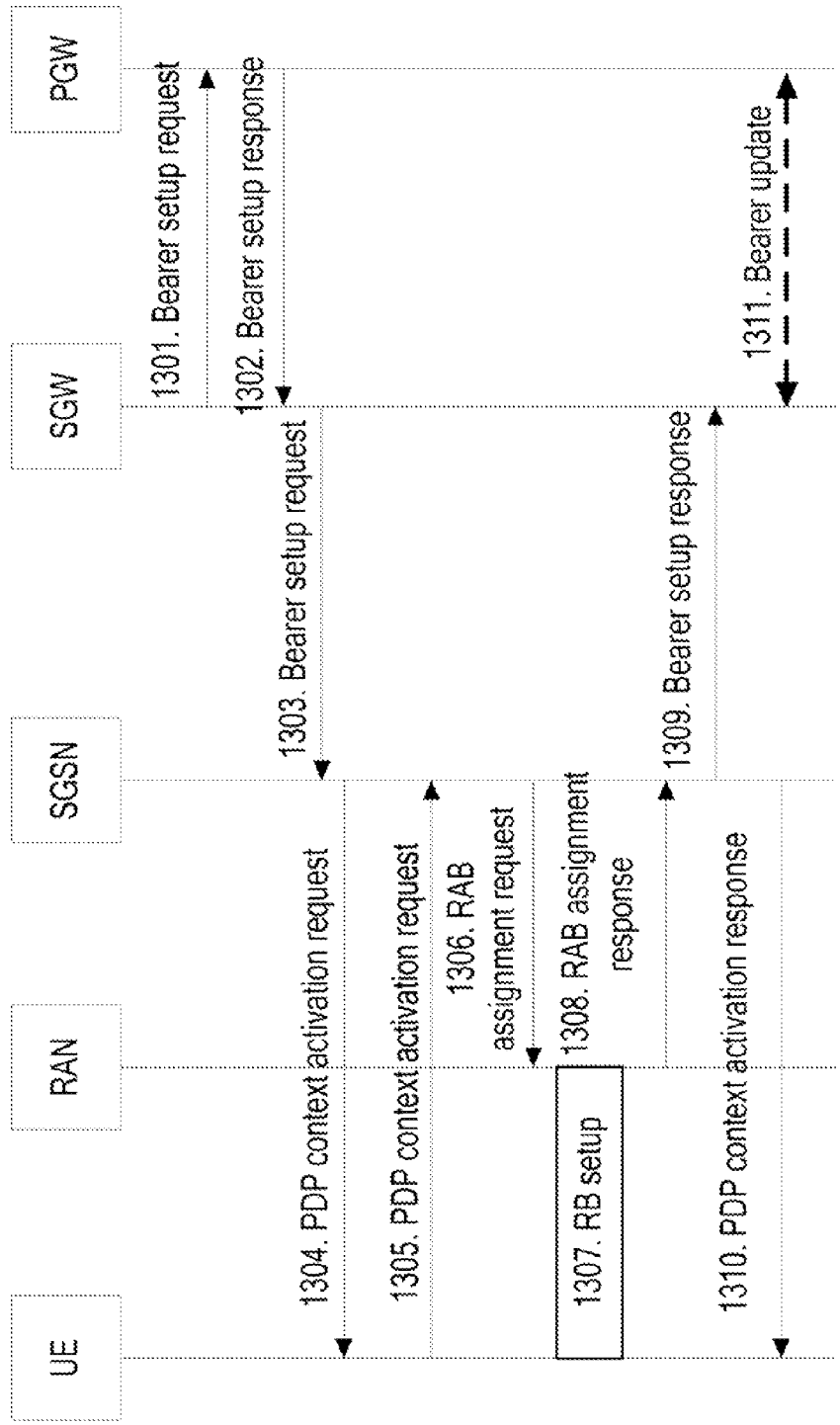
FIG. 13 is a flowchart of a method for setting up a bearer according to an eleventh embodiment of the present invention.

FIG. 13 shows a method for setting up a bearer according to the eleventh embodiment of the present invention. This method concerns bearer setup triggered by the SGW, and includes the following steps:

Step 1301: The SGW sends a bearer setup request to the PGW.

After obtaining the first QoS information and first bearer ID, the SGW sends a first trigger message to the PGW. Then, the setup of a first bearer begins. The first trigger message may be a bearer setup request or a bearer setup notification. In this embodiment, the first trigger message is a bearer setup request.

Step 1302: The PGW returns a bearer setup response to the SGW.

Then, the setup of the first bearer ends.

Step 1303: The SGW sends a bearer setup request to the SGSN.

Then, the setup of a second bearer begins.

Step 1304: The SGSN sends a PDP context activation request to the UE.

Step 1305: The UE sends a PDP context activation request to the SGSN.

Step 1306: The SGSN sends an RAB assignment request to the RAN.

Then, the setup of a third bearer begins.

Step 1307: The RAN sets up an RB with the UE.

Step 1308: The RAN returns an RAB assignment response to the SGSN.

Then, the setup of the third bearer ends.

Step 1309: The SGSN returns a bearer setup response to the SGW.

If the third bearer is set up by using the second QoS information associated with the first QoS information, the setup of the second bearer ends. If the third bearer is set up by using the third QoS information determined by the UE, the response may carry fourth QoS information associated with the third QoS information. The SGW re-allocates a second UBR according to the fourth QoS information; after the SGSN updates the information of the re-allocated second UBR, the setup of the second bearer ends.

Step 1310: The SGSN returns a PDP context activation response to the UE.

Step 1311: The SGW sends a bearer update message to the PGW.

If the third bearer is set up by using the third QoS information determined by the UE, the first bearer that is already set up needs to be updated.

In this embodiment, when the SGSN of 3GPP R8 is connected to the SGW directly, the setup of the bearer between the UE and the PGW is triggered by the SGW through communications between the SGW and the PGW. Thus, resources of each network entity in the network are fully utilized.

Figure 14:
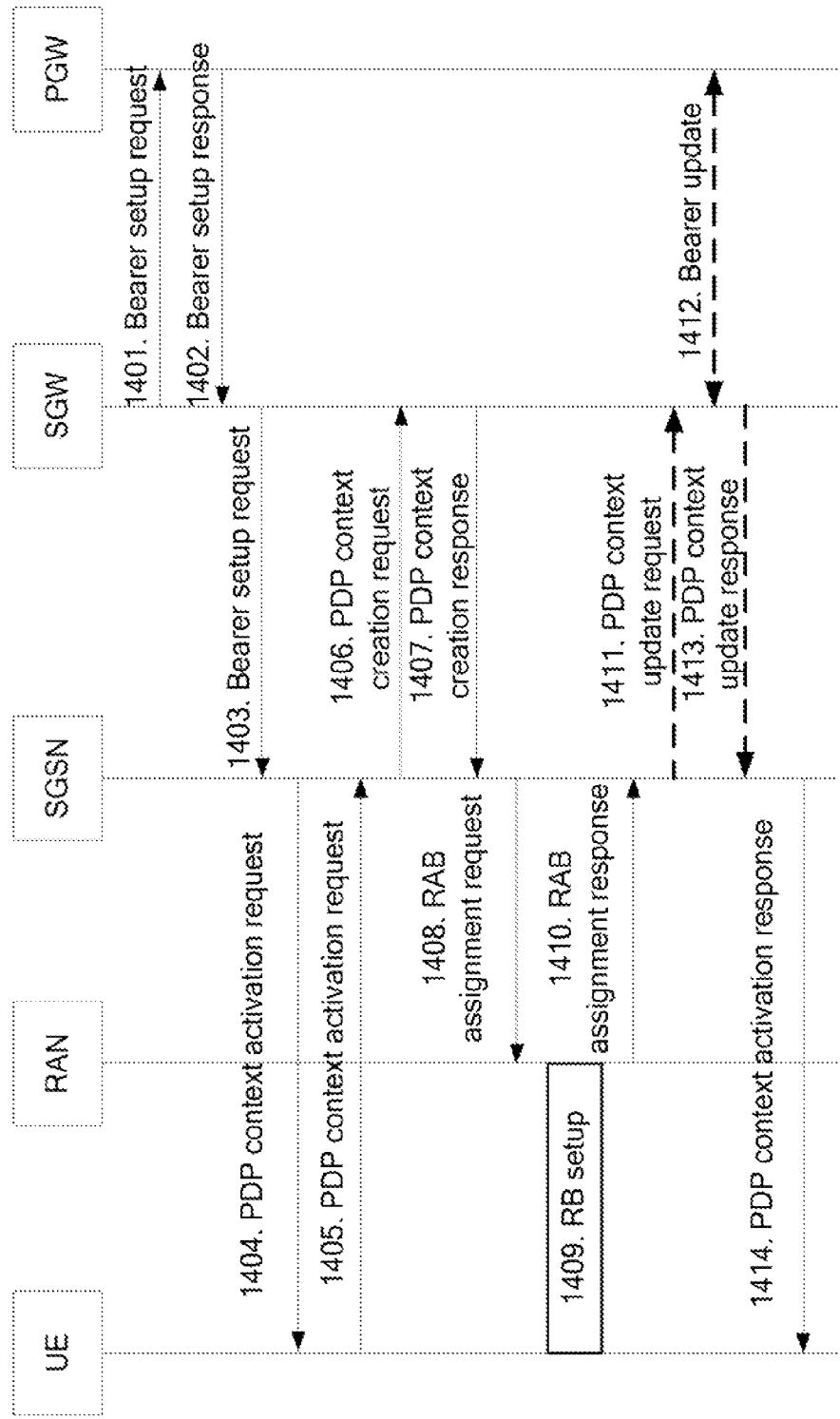
FIG. 14 is a flowchart of a method for setting up a bearer according to a twelfth embodiment of the present invention.

FIG. 14 shows a method for setting up a bearer according to the twelfth embodiment of the present invention. This method concerns bearer setup triggered by the SGW, and includes the following steps:

Step 1401: The SGW sends a bearer setup request to the PGW.

Then, the setup of a first bearer begins.

Step 1402: The PGW returns a bearer setup response to the SGW.

Then, the setup of the first bearer ends.

Step 1403: The SGW sends a bearer setup request to the SGSN.

Step 1404: The SGSN sends a PDP context activation request to the UE.

Step 1405: The UE sends a PDP context activation request to the SGSN.

Step 1406: The SGSN sends a PDP context creation request to the SGW.

Then, the setup of a second bearer begins.

Step 1407: The SGW returns a PDP context creation response to the SGSN.

Then, the setup of the second bearer ends.

Step 1408: The SGSN sends an RAB assignment request to the RAN.

Then, the setup of a third bearer begins.

Step 1408: The RAN sets up an RB with the UE.

Step 1410: The RAN returns an RAB assignment response to the SGSN.

Then, the setup of the third bearer ends.

Step 1411: The SGSN sends a PDP context update request to the SGW.

If the third bearer is set up by using the third QoS information determined by the UE, the second bearer that is already set up begins to be updated.

Step 1412: The SGW sends a bearer update message to the PGW.

If the third bearer is set up by using the third QoS information determined by the UE, the first bearer that is already set up needs to be updated.

Step 1413: The SGW returns a PDP context update response to the SGSN.

Then, the update of the second bearer ends.

Step 1414: The SGSN returns a PDP context activation response to the UE.

In this embodiment, when the SGSN of 3GPP R8 is connected to the SGW directly, the setup of the bearer between the UE and the PGW is triggered by the SGW through communications between the SGW and the PGW. Thus, resources of each network entity in the network are fully utilized.

Figure 15:
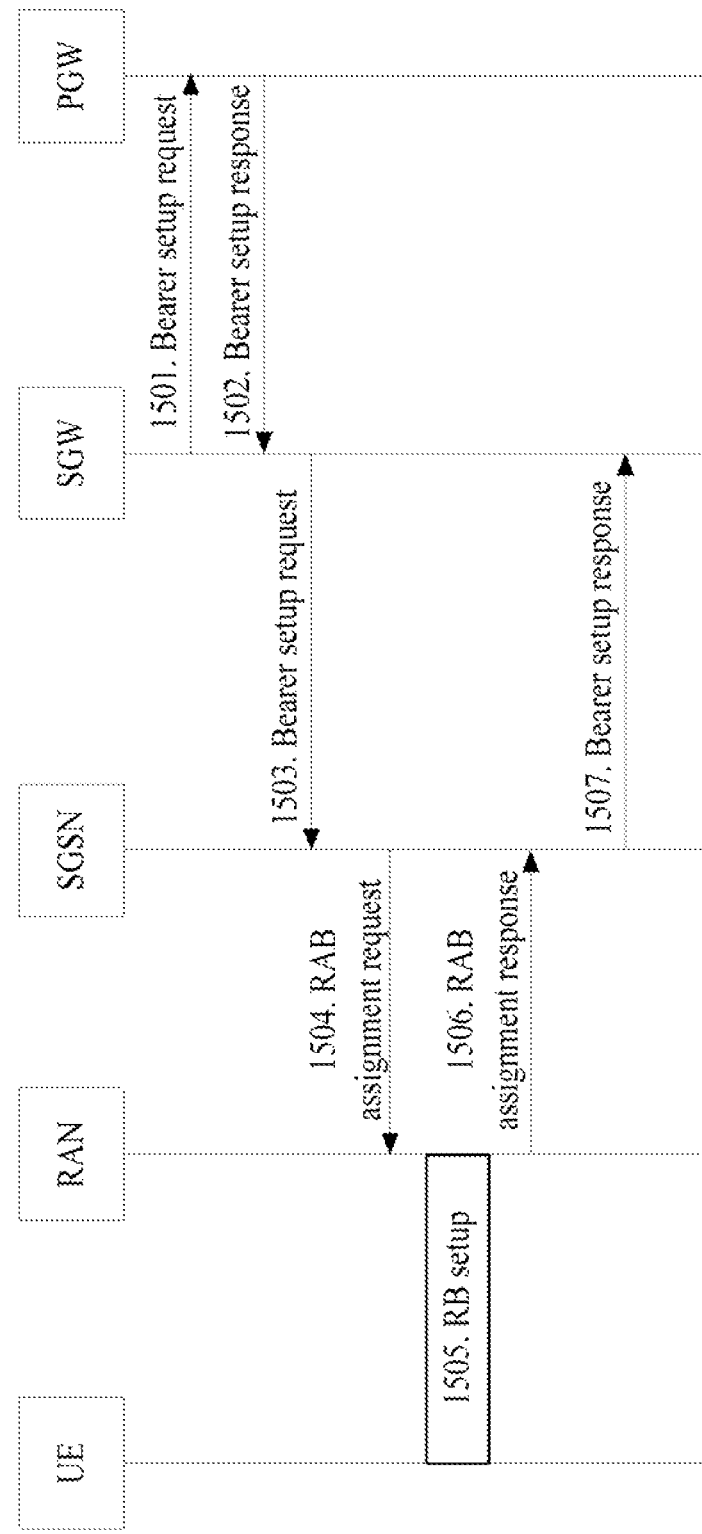
FIG. 15 is a flowchart of a method for setting up a bearer according to a thirteenth embodiment of the present invention.

FIG. 15 shows a method for setting up a bearer according to the thirteenth embodiment of the present invention. This method concerns bearer setup triggered by the SGW, and includes the following steps:

Step 1501: The SGW sends a bearer setup request to the PGW.

After the SGW obtains the first bearer ID and first QoS information, the setup of a first bearer begins.

Step 1502: The PGW returns a bearer setup response to the SGW.

Then, the setup of the first bearer ends.

Step 1503: The SGW sends a bearer setup request to the SGSN.

Then, the setup of a second bearer begins.

Step 1504: The SGSN sends an RAB assignment request to the RAN.

Then, the setup of a third bearer begins.

Step 1505: The RAN sets up an RB with the UE.

Step 1506: The RAN returns an RAB assignment response to the SGSN.

Then, the setup of the third bearer ends.

Step 1507: The SGSN returns a bearer setup response to the SGW.

Then, the setup of the second bearer ends.

In this embodiment, when the SGSN of 3GPP R8 is connected to the SGW directly, the setup of the bearer between the UE and the PGW is triggered by the SGW through communications between the SGW and the PGW. Thus, resources of each network entity in the network are fully utilized.

4. Bearer setup triggered by the SGSN

Figure 16:
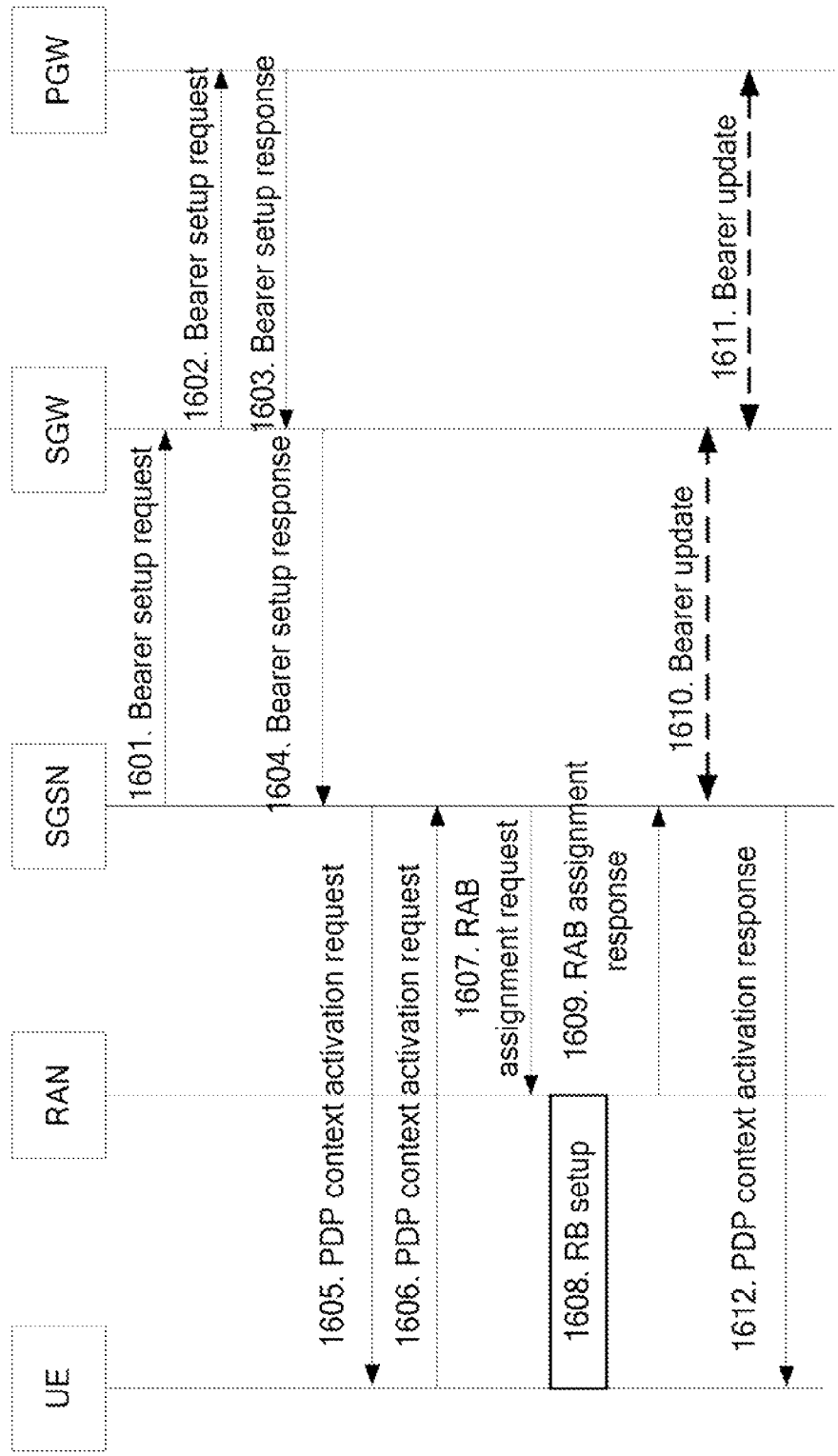
FIG. 16 is a flowchart of a method for setting up a bearer according to a fourteenth embodiment of the present invention.

FIG. 16 shows a method for setting up a bearer according to the fourteenth embodiment of the present invention. This method concerns bearer setup triggered by the SGSN, and includes the following steps:

Step 1601: The SGSN sends a bearer setup request to the SGW.

After obtaining the first QoS information and first bearer ID, the SGSN sends a second trigger message to the SGW. Then, the setup of a second bearer begins. The second trigger message may be a bearer setup request, a bearer setup notification or a PDP context creation/update request. In this embodiment, the second trigger message is a bearer setup request.

Step 1602: The SGW sends a bearer setup request to the PGW.

Then, the setup of a first bearer begins.

Step 1603: The PGW returns a bearer setup response to the SGW.

Then, the setup of the first bearer ends.

Step 1604: The SGW returns a bearer setup response to the SGSN.

Then, the setup of the second bearer ends.

Step 1605: The SGSN sends a PDP context activation request to the UE.

Step 1606: The UE sends a PDP context activation request to the SGSN.

Step 1607: The SGSN sends an RAB assignment request to the RAN.

Then, the setup of a third bearer begins.

Step 1608: The RAN sets up an RB with the UE.

Step 1609: The RAN returns an RAB assignment response to the SGSN.

Then, the setup of the third bearer ends.

Step 1610: The SGSN sends a bearer update message to the SGW.

If the third bearer is set up by using the third QoS information determined by the UE, the second bearer that is already set up needs to be updated.

Step 1611: The SGW sends a bearer update message to the PGW.

If the third bearer is set up by using the third QoS information determined by the UE, the first bearer that is already set up needs to be updated. Step 1610 and step 1611 may be performed in any sequence or at the same time.

Step 1612: The SGSN returns a PDP context activation response to the UE.

In this embodiment, when the SGSN of 3GPP R8 is connected to the SGW directly, the setup of the bearer between the UE and the PGW is triggered by the SGSN through communications between the SGW and the PGW. Thus, resources of each network entity in the network are fully utilized.

Figure 17:
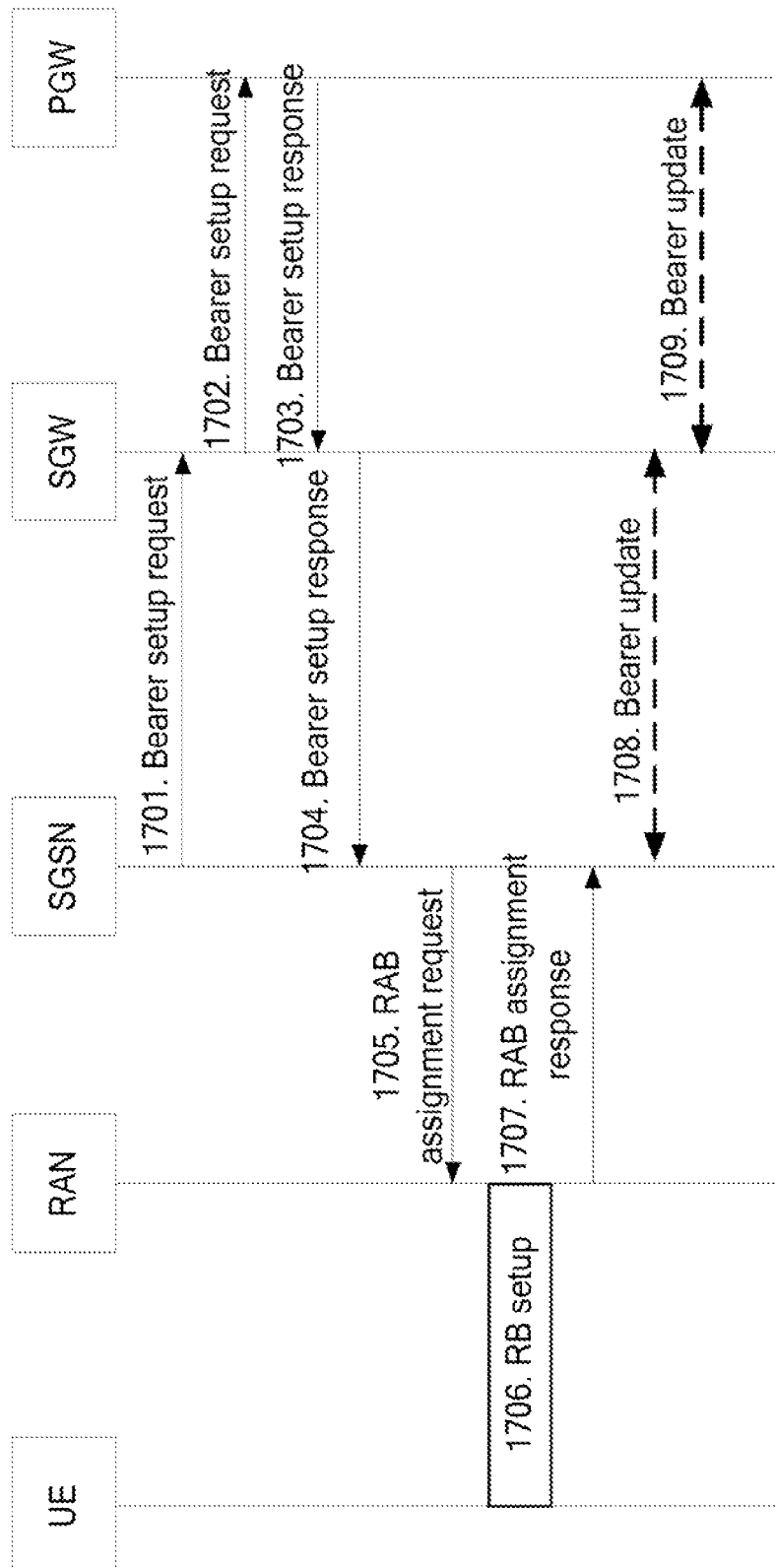
FIG. 17 is a flowchart of a method for setting up a bearer according to a fifteenth embodiment of the present invention.

FIG. 17 shows a method for setting up a bearer according to the fifteenth embodiment of the present invention. This method concerns bearer setup triggered by the SGSN, and includes the following steps:

Step 1701: The SGSN sends a bearer setup request to the SGW.

After the SGSN obtains the first QoS information and first bearer ID, the setup of a second bearer begins.

Step 1702: The SGW sends a bearer setup request to the PGW.

Then, the setup of a first bearer begins.

Step 1703: The PGW returns a bearer setup response to the SGW.

Then, the setup of the first bearer ends.

Step 1704: The SGW returns a bearer setup response to the SGSN.

Then, the setup of the second bearer ends.

Step 1705: The SGSN sends an RAB assignment request to the RAN.

Then, the setup of a third bearer begins.

Step 1706: The RAN sets up an RB with the UE.

Step 1707: The RAN returns an RAB assignment response to the SGSN.

Then, the setup of the third bearer ends.

Step 1708: The SGSN sends a bearer update message to the SGW.

If the third bearer is set up by using the third QoS information determined by the UE, the second bearer that is already set up needs to be updated.

Step 1709: The SGW sends a bearer update message to the PGW.

If the third bearer is set up by using the third QoS information determined by the UE, the first bearer that is already set up needs to be updated.

In this embodiment, when the SGSN of 3GPP R8 is connected to the SGW directly, the setup of the bearer between the UE and the PGW is triggered by the SGSN through communications between the SGW and the PGW. Thus, resources of each network entity in the network are fully utilized.

The preceding embodiments 1 to 15 describe the cases that the SGSN participates in transmission of user plane data. In practical applications, the SGSN may not participate in the transmission of user plane data. In this case, the SGSN does not allocate the second DBR and third UBR, and may act as a transit node for exchanging the user plane information between the RAN and the SGW. That is, the SGSN may send the received SGW uplink user plane information to the RAN and the received RAN downlink user plane information to the SGW. Thus, the bearer between the RAN and the SGW is directly set up.

Similarly, the SGW may also not participate in the transmission of user plane data. In this case, the SGW does not allocate the first DBR and second UBR, and may act as the transit node for exchanging the user plane information between the SGSN and the PGW. That is, the SGW may send the received PGW uplink user plane information to the SGSN and the received SGSN downlink user plane information to the PGW. Thus, the bearer between the SGSN and the PGW is directly set up.

Of course, it is also possible that neither the SGW nor the SGSN may participate in the transmission of user plane data. In this case, the bearer between the RAN and the PGW is directly set up.

Figure 18:
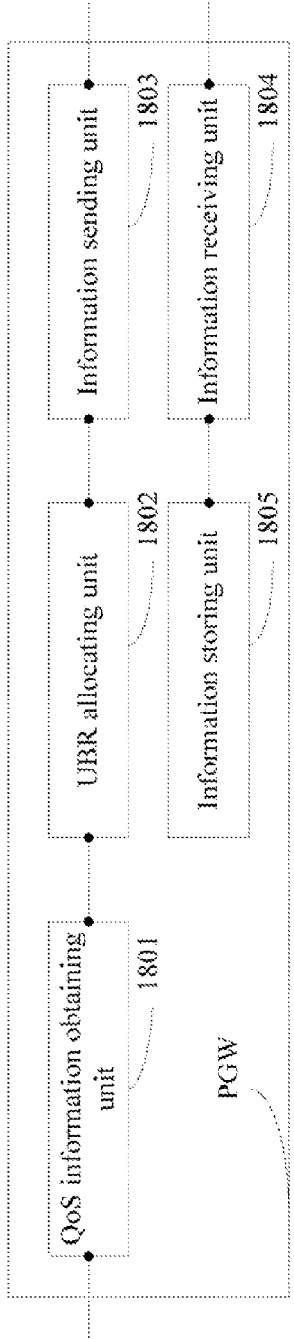
FIG. 18 shows a structure of a PGW according to an embodiment of the present invention.

FIG. 18 shows a PGW according to an embodiment of the present invention. The PGW includes:

a QoS information obtaining unit 1801, adapted to obtain first QoS information;

a UBR allocating unit 1802, adapted to allocate a first UBR for a first bearer according to the first QoS information;

an information sending unit 1803, adapted to send the first QoS information and information about the first UBR;

an information receiving unit 1804, adapted to receive the first QoS information, information about the first DBR and first bearer ID; and an information storing unit 1805, adapted to store the first QoS information, information about the first DBR and first bearer ID.

In this embodiment of the PGW, when the SGSN of 3GPP R8 is connected to the SGW directly, the SGSN may set up a bearer between the UE and the PGW through communications between the SGW and the PGW. Thus, resources of each network entity in the network are fully utilized.

In practical applications, the PGW according to this embodiment may further include:

a bearer ID obtaining unit, adapted to obtain a first bearer ID; and the information sending unit 1803, further adapted to send the first bearer ID along with the first QoS information and information about the first UBR.

The PGW according to this embodiment may initiate bearer setup actively or it may be triggered by the trigger information of other network devices to initiate bearer setup. When the PGW is triggered by other network devices, the PGW according to this embodiment may further include:

a trigger information receiving unit, adapted to receive the trigger information for triggering bearer setup; and the QoS information obtaining unit 1801, adapted to obtain the first QoS information after the trigger information receiving unit receives the trigger information.

Because multiple bearers may be set up between the PGW and the same UE, these bearers may be set up based on different QoS information. To differentiate these bearers, the PGW according to this embodiment of the present invention may further include:

a TFT allocating unit, adapted to allocate an uplink TFT associated with a bearer, a TFT sending unit, adapted to send the uplink TFT, where: the uplink TFT is processed by the UE; when the UE is connected to the PGW directly, the uplink TFT may be sent to the UE directly; when the UE is connected to the PGW through other network devices, the uplink TFT is sent to the UE through other network devices;

a TFT receiving unit, adapted to receive a downlink TFT associated with a bearer, where the downlink TFT is processed by the PGW; and a TFT storing unit, adapted to store the downlink TFT.

Figure 19:
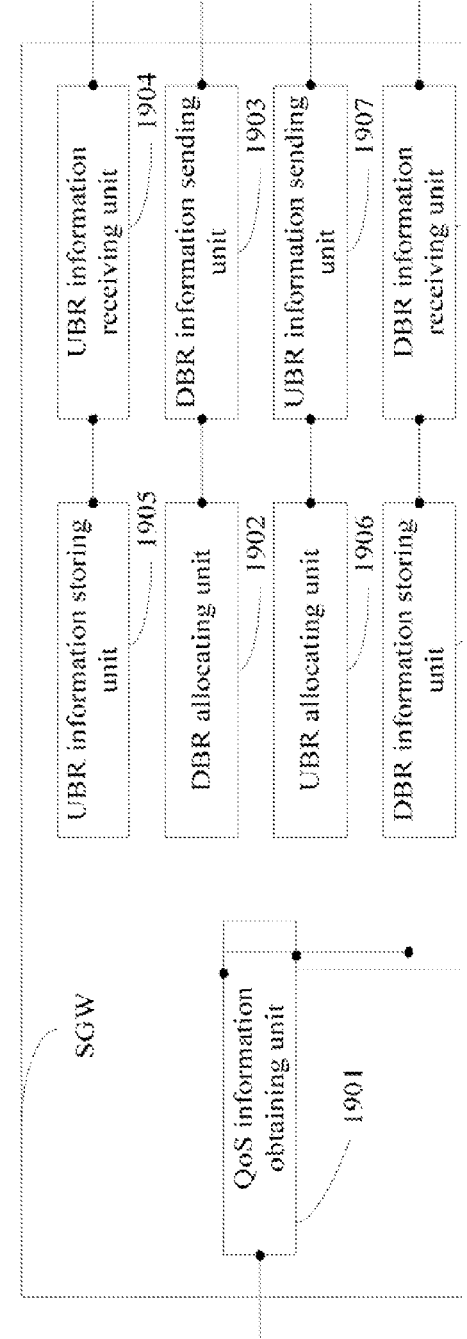
FIG. 19 shows a structure of an SGW according to an embodiment of the present invention.

FIG. 19 shows an SGW according to an embodiment of the present invention.

The SGW includes:

a QoS information obtaining unit 1901, adapted to obtain first QoS information;

a DBR allocating unit 1902, adapted to allocate a first DBR for a first bearer according to the first QoS information;

a DBR information sending unit 1903, adapted to send the first QoS information and information about the first DBR;

a UBR information receiving unit 1904, adapted to receive the first QoS information, information about the first UBR and first bearer ID;

a UBR information storing unit 1905, adapted to store the first QoS information, information about the first UBR and first bearer ID;

a UBR allocating unit 1906, adapted to allocate a second UBR for the second bearer according to the first QoS information;

a UBR information sending unit 1907, adapted to send the first QoS information and information about the second UBR;

a DBR information receiving unit 1908, adapted to receive the first QoS information, information about the second DBR and first bearer ID; and a DBR information storing unit 1909, adapted to store the first QoS information, information about the second DBR and first bearer ID.

In this embodiment of the SGW, when the SGSN of 3GPP R8 is connected to the SGW directly, the SGSN may set up a bearer between the UE and the PGW through communications between the SGW and the PGW. Thus, resources of each network entity in the network are fully utilized.

In practical applications, the SGW according to this embodiment may further include:

a bearer ID obtaining unit, adapted to obtain a first bearer ID;

the DBR information sending unit 1903, further adapted to send the first bearer ID along with the first QoS information and information about the first DBR; and the UBR information sending unit 1907, further adapted to send the first bearer ID along with the first QoS information and information about the second UBR.

The SGW according to this embodiment may trigger the PGW to initiate bearer setup. Thus, the SGW according to this embodiment may further include:

a trigger information sending unit, adapted to send trigger information for triggering bearer setup.

FIG. 20 shows an SGSN according to an embodiment of the present invention. The SGSN includes:

a QoS information obtaining unit 2001, adapted to obtain first QoS information;

a DBR allocating unit 2002, adapted to allocate a second DBR for a second bearer according to the first QoS information;

a DBR information sending unit 2003, adapted to send the first QoS information and information about the second DBR;

a UBR information receiving unit 2004, adapted to receive the first QoS information, information about the second UBR, and first bearer ID;

a UBR information storing unit 2005, adapted to store the first QoS information, information about the second UBR, and first bearer ID;

a UBR allocating unit 2006, adapted to allocate a third UBR for the second bearer according to the second QoS information associated with the first QoS information;

a UBR information sending unit 2007, adapted to send the second QoS information and information about the third UBR;

a DBR information receiving unit 2008, adapted to receive the second QoS information, information about the third DBR, and second bearer ID associated with the first bearer ID; and a DBR information storing unit 2009, adapted to store the second QoS information, information about the third DBR, and second bearer ID.

In this embodiment of the SGSN, when the SGSN of 3GPP R8 is connected to the SGW directly, the SGSN may set up a bearer between the UE and the PGW through communications between the SGW and the PGW. Thus, resources of each network entity in the network are fully utilized.

Because the UE and the SGW may use different QoS information, the SGSN according to this embodiment may further include:

a QoS mapping relationship processing unit, adapted to: store the mapping relationship between QoS information, and map the first QoS information into the second QoS information according to the mapping relationship between QoS information.

In practical applications, the SGSN according to this embodiment may further include:

a bearer ID obtaining unit, adapted to obtain the first bearer ID;

the DBR information sending unit 2003, further adapted to send the first bearer ID along with the first QoS information and information about the second DBR; and the UBR information sending unit 2007, further adapted to send the second bearer ID associated with the first bearer ID along with the second QoS information and information about the third UBR.

Because the UE and the SGW may use different bearer IDs, the SGSN according to this embodiment may further include:

a bearer ID mapping relationship processing unit, adapted to: store the mapping relationship between bearer IDs, and map the first bearer ID into the second bearer ID according to the mapping relationship between bearer IDs.

Because the SGSN according to this embodiment may trigger the PSW to initiate bearer setup, the SGSN according to this embodiment may further include:

a trigger information sending unit, adapted to send trigger information for triggering bearer setup.

FIG. 21 shows a UE according to an embodiment of the present invention. The UE includes:

a QoS information obtaining unit 2101, adapted to obtain second QoS information;

a DBR allocating unit 2102, adapted to allocate a radio bearer DBR for the RB according to the second QoS information;

an information sending unit 2103, adapted to send the second QoS information and information about the radio bearer DBR;

an information receiving unit 2104, adapted to receive the second QoS information, radio bearer UBR information, and second bearer ID; and an information storing unit 2105, adapted to store the second QoS information, radio bearer UBR information, and second bearer ID.

In this embodiment of the UE, when the SGSN of 3GPP R8 is connected to the SGW directly, the SGSN may set up a bearer between the UE and the PGW through communications between the SGW and the PGW. Thus, resources of each network entity in the network are fully utilized.

In practical applications, the UE according to this embodiment may further include:

a bearer ID obtaining unit, adapted to obtain the second bearer ID; and the information sending unit 2103, further adapted to send the second bearer ID along with the second QoS information and information about the DBR.

The UE according to this embodiment may trigger the PGW to initiate bearer setup. Thus, the UE according to this embodiment may further include:

a trigger information sending unit, adapted to send trigger information for triggering bearer setup.

It is understandable to those skilled in the art that all or part of the steps in the preceding embodiments may be performed by hardware following instructions of a program. The program may be stored in a computer readable storage medium. When being executed, the program carries out a process including the following steps:

the PGW obtains first QoS information and a first bearer ID, and sets up a bearer between the PGW and the RAN according to the first QoS information, where the bearer is associated with the first bearer ID; and the RAN sets up an RB with the UE according to the second QoS information associated with the first QoS information, where the RB is associated with the second bearer ID associated with the first bearer ID.

The preceding storage medium may be a read-only memory (ROM), a magnetic disk or a compact disk (CD).

In the technical solution of the present invention, when the UE is connected to the SGW through the SGSN, the SGSN and the SGW set up a bearer between the UE and the PGW. Thus, resources of each network entity in the network are fully utilized.

Detailed above are method and system for setting up a bearer according to embodiments of the present invention. The embodiments are intended to help understand the methods and key ideas of the present invention only, and not intended to limit the present invention. It is apparent that those skilled in the art can make various modifications and variations to the present invention without departing from the spirit and scope of the present invention.

What is claimed is:

1. A method for setting up a bearer for communications between a serving general packet radio service support node (SGSN) and a radio access network (RAN) comprising:
   mapping, by the SGSN, quality of service (QoS) information associated with communications between the SGSN and a packet data network gateway (PGW) to derive QoS information associated with the communications between the SGSN and the RAN according to a mapping relationship referred to by the SGSN;
   configuring, by the SGSN, the bearer for the communications between the SGSN and the RAN in accordance with the derived QoS information;
   mapping, by the SGSN, a bearer ID associated with a bearer for the communications between the SGSN and the PGW, to derive a bearer ID for the bearer for communications between the SGSN and the RAN according to a pre-defined mapping relationship referred to by the SGSN; and
   associating, by the SGSN, the derived bearer ID with the bearer for communications between the SGSN and the RAN.

2. The method of claim 1, wherein the communications between the SGSN and the PGW are communications through a serving gateway (SGW).

3. The method of claim 1, further comprising the steps of:
   configuring, by the SGSN, the bearer for the communications between the SGSN and the PGW in accordance with QoS information associated with the communications between the SGSN and the PGW; and
   associating, by the SGSN, a bearer ID with the configured bearer for the communications between the SGSN and the PGW.

4. A serving general packet radio service support node (SGSN) comprising:
   a processor; and
   a non-transitory computer readable storage medium storing programming for execution by the processor, the programming including instructions to:
      set up a bearer for communications between the SGSN and a radio access network (RAN) according to a quality of service (QoS) information derived from QoS information associated with a bearer for communications between the SGSN and a packet data network gateway (PGW) through a serving gateway (SGW); and
      associate the bearer between the SGSN and the RAN with a bearer ID derived from a bearer ID associated with the bearer for communications between the SGSN and the PGW through the SGW.

5. The SGSN of claim 4, wherein the programming with instructions to set up the bearer includes instructions to:
   derive the QoS information of communications between the SGSN and RAN by mapping the QoS information from the QoS information associated with the bearer for communications between the SGSN and the PGW through the SGW, according to a mapping relationship between them.

6. The SGSN of claim 4, wherein the programming with instructions to associate the bearer with the bearer ID includes instructions to:
derive the bearer ID by mapping the bearer ID with the bearer ID associated with the bearer for communications between the SGSN and the PGW through the SGW, according to a mapping relationship between them.

7. A serving general packet radio service support node (SGSN), comprising:
a processor; and
a non-transitory computer readable storage medium storing programming for execution by the processor, the programming including instructions to:
set up a bearer between the SGSN and a packet data network gateway (PGW) through a serving gateway (SGW) according to first quality of service (QoS) information, wherein the bearer between the SGSN and the PGW is associated with a first bearer ID; and
set up a bearer between the SGSN and a radio access network (RAN) according to second QoS information which is mapped from the first QoS information according to a mapping relationship between the first Qos information and the second QoS information, wherein the bearer between the SGSN and the RAN is associated with a second bearer ID which is mapped from the first bearer ID according to a mapping relationship between the first bearer ID and the second bearer ID.

8. The SGSN of claim 7, wherein the instructions to set up the bearer between the SGSN and the RAN comprises instructions to:
send a request message for a radio access bearer (RAB) assignment to the RAN for the RAN to set up an radio bear with a user equipment (UE); and
receive a response message for the RAB assignment from the RAN.

* * * * *